United States Patent
Wloczysiak

(10) Patent No.: US 10,256,850 B2
(45) Date of Patent: Apr. 9, 2019

(54) ARCHITECTURES AND METHODS RELATED TO IMPROVED ISOLATION FOR DIPLEXER PATHS

(71) Applicant: SKYWORKS SOLUTIONS, INC., Woburn, MA (US)

(72) Inventor: Stephane Richard Marie Wloczysiak, Irvine, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 281 days.

(21) Appl. No.: 14/683,539

(22) Filed: Apr. 10, 2015

(65) Prior Publication Data

US 2015/0295597 A1    Oct. 15, 2015

Related U.S. Application Data

(60) Provisional application No. 61/978,879, filed on Apr. 12, 2014.

(51) Int. Cl.
*H04B 1/00* (2006.01)
*H04W 40/02* (2009.01)

(52) U.S. Cl.
CPC .......... *H04B 1/0057* (2013.01); *H04W 40/02* (2013.01)

(58) Field of Classification Search
None
See application file for complete search history.

(56) References Cited

U.S. PATENT DOCUMENTS

| 7,010,273 | B2 * | 3/2006 | Satoh | H04B 1/006 455/73 |
| 2006/0151203 | A1 * | 7/2006 | Krueger | H03H 9/0557 174/260 |
| 2009/0133095 | A1 * | 5/2009 | Phillips | H04N 7/104 725/149 |
| 2011/0243120 | A1 * | 10/2011 | Ginsburg | G06K 7/10237 370/345 |
| 2013/0278477 | A1 | 10/2013 | Dupuy et al. | |

(Continued)

FOREIGN PATENT DOCUMENTS

WO    2013041146 A1    3/2013

OTHER PUBLICATIONS

International Search Report and Written Opinion for corresponding PCT/US2015/025278 dated Jul. 9, 2015.

*Primary Examiner* — James P Duffy
(74) *Attorney, Agent, or Firm* — Chang & Hale LLP

(57) ABSTRACT

Architectures and methods related to improved isolation for diplexer paths. In some embodiments, an architecture for routing radio-frequency (RF) signals can include an input node and an output node, and a distributed network of signal paths implemented between the input node and the output node. The distributed network of signal paths can include a first path having N switches including a selected switch, with the quantity N being an integer greater than 2. The first path can be capable of routing a first RF signal between the input node and the output node when enabled. The distributed network of signal paths can further include a second path capable of routing a second RF signal between the input node and the output node, with the second path including the selected switch. The second path can include a plurality of open switches when disabled and the first path is enabled.

18 Claims, 15 Drawing Sheets

(56) References Cited

U.S. PATENT DOCUMENTS

| | | | |
|---|---|---|---|
| 2013/0321095 A1 | 12/2013 | Lam et al. | |
| 2014/0036744 A1* | 2/2014 | Zeng | H04L 5/00 370/297 |
| 2014/0055210 A1 | 2/2014 | Black et al. | |
| 2014/0062577 A1 | 3/2014 | Chih-Sheng | |
| 2014/0092795 A1* | 4/2014 | Granger-Jones | H04L 5/08 370/297 |
| 2014/0329475 A1* | 11/2014 | Ella | H04B 1/006 455/77 |

\* cited by examiner

ARCHITECTURES AND METHODS RELATED TO IMPROVED ISOLATION FOR DIPLEXER PATHS

CROSS-REFERENCE TO RELATED APPLICATION(S)

This application claims priority to U.S. Provisional Application No. 61/978,879 filed Apr. 12, 2014, entitled ARCHITECTURES AND METHODS RELATED TO IMPROVED ISOLATION FOR DIPLEXER PATHS, the disclosure of which is hereby expressly incorporated by reference herein in its entirety.

BACKGROUND

Field

The present disclosure relates to diplexer paths having improved isolation.

Description of the Related Art

Semiconductor switches are commonly used for radio-frequency (RF) applications. Such switches can be combined with conductive paths to form RF circuits. A switch can be turned ON (closed) or OFF (opened) by application of appropriate switching signal(s).

SUMMARY

According to some teachings, the present disclosure relates to an architecture for routing radio-frequency (RF) signals. The architecture includes an input node and an output node, and a distributed network of signal paths implemented between the input node and the output node. The distributed network of signal paths includes a first path having N switches including a selected switch, with the quantity N being an integer greater than 2. The first path is capable of routing a first RF signal between the input node and the output node when enabled. The distributed network of signal paths further includes a second path capable of routing a second RF signal between the input node and the output node. The second path includes the selected switch. The second path includes a plurality of open switches when disabled and the first path is enabled.

In some embodiments, the input node can include a node coupled to an antenna port. The output node can include a node coupled to an input of a low-noise amplifier (LNA).

In some embodiments, the distributed network of signal paths can include a plurality of multiplexers, with each multiplexer including a plurality of ports multiplexed unto a common port. Each multiplexer can be a diplexer. The distributed network of signal paths can include a plurality of diplexer selection paths between the input node and respective common ports of the diplexers, with each diplexer selection path including a diplexer selection switch.

In some embodiments, the distributed network of signal paths can further include a first port selection path and a second port selection path for each diplexer. Each of the first port selection path and the second port selection path can include a port selection switch. The distributed network of signal paths can further include an enable selection path that couples a plurality of the port selection paths to the output node. Each of the enable selection path can include an enable switch.

In some embodiments, the selected switch can be one of the diplexer selection switches. In some embodiments, the first port selection path and the second port selection path for a given diplexer can be coupled to two different enable selection paths. In some embodiments, each path in the distributed network of signal paths can include a corresponding enable selection path, a corresponding port selection port, and a corresponding diplexer selection path, such that the quantity N is 3. The second path can include two open switches when disabled and the first path is enabled. The two open switches can be the port selection switch and the enable switch corresponding to the second path.

In some embodiments, at least some of the distributed network of signal paths can be configured to be capable of operating in a carrier aggregation (CA) mode. In some embodiments, the distributed network of signal paths can be configured to be operated in a non-carrier aggregation mode.

In some embodiments, the disabled second path with the plurality of open switches can provide improved isolation performance for the second path than a disabled signal path having one open switch.

In some implementations, the present disclosure relates to a radio-frequency (RF) module that includes a packaging substrate configured to receive a plurality of components, and an input node and an output node implemented on or within the packaging substrate. The RF module further includes a plurality of signal conditioning circuits implemented on or within the packaging substrate. The RF module further includes a distributed network of signal paths configured to route RF signals to and from the plurality of signal conditioning circuits between the input node and the output node. The distributed network of signal paths includes a first path having N switches including a selected switch, with the quantity N being an integer greater than 2. The first path is capable of routing a first RF signal between the input node and the output node when enabled. The distributed network of signal paths further includes a second path capable of routing a second RF signal between the input node and the output node. The second path includes the selected switch. The second path includes a plurality of open switches when disabled and the first path is enabled.

In some embodiment, the plurality of signal conditioning circuits can include a plurality of diplexers. In some embodiment, the RF module can further include a low-noise amplifier (LNA) implemented on the packaging substrate. The LNA can be coupled to the output node to receive the first RF signal through the first path when the first path is enabled.

In some embodiment, the RF module can be a front-end module. In some embodiment, the RF module can be a diversity receive (DRx) module. In some embodiment, the LNA can be implemented on a first semiconductor die. In some embodiment, some or all of the switches associated with the distributed network of signal paths can be implemented on a second semiconductor die.

In a number of implementations, the present disclosure relates to a method for fabricating a radio-frequency (RF) module. The method includes providing or forming a packaging substrate configured to receive a plurality of components. The method further includes implementing a plurality of signal conditioning circuits on or within the packaging substrate between an input node and an output node. The method further includes forming a distributed network of signal paths to route RF signals to and from the plurality of signal conditioning circuits between the input node and the output node. The distributed network of signal paths includes a first path having N switches including a selected switch, with the quantity N being an integer greater than 2. The first path is capable of routing a first RF signal between the input node and the output node when enabled. The distributed network of signal paths further includes a second path capable of routing a second RF signal between the input node and the output node. The second path includes the selected switch. The second path includes a plurality of open switches when disabled and the first path is enabled.

In accordance with a number of implementations, the present disclosure relates to a radio-frequency (RF) device that includes a receiver configured to process RF signals, and a front-end module (FEM) in communication with the receiver. The FEM includes a plurality of signal conditioning circuits, and a distributed network of signal paths configured to route the RF signals to and from the plurality of signal conditioning circuits between an input node and an output node. The distributed network of signal paths includes a first path having N switches including a selected switch, with the quantity N being an integer greater than 2. The first path is capable of routing a first RF signal between the input node and the output node when enabled. The distributed network of signal paths further includes a second path capable of routing a second RF signal between the input node and the output node. The second path includes the selected switch. The second path includes a plurality of open switches when disabled and the first path is enabled. The RF device further includes an antenna in communication with the input node, with the antenna being configured to receive the RF signals.

In some embodiments, the RF device can include a wireless device. The wireless device can be, for example, a cellular phone. In some embodiments, the antenna can include a diversity antenna, and the RF module can include a diversity receive (DRx) module). The wireless device can further include an antenna switch module (ASM) configured to route the RF signals from the diversity antenna to the receiver. The DRx module can be implemented between the diversity antenna and the ASM.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

Semiconductor switches are used frequently in integrated circuits, including those configured for processing radio-frequency (RF) signals. Such switches can be combined with conductive paths to form and/or facilitate various RF circuits. A switch can be turned ON (closed) or OFF (opened) by application of appropriate switching signal(s), and such a switch can include one or more semiconductor devices (such as field-effect transistors (FETs) and related devices) arranged to allow (when ON) or inhibit (when OFF) passage of RF signals. Accordingly, a switch in its OFF state provides more isolation between its two terminals than when in the ON state.

Disclosed herein are examples of how switchable paths can be arranged to allow routing of various RF signals in a selected manner while providing improved isolation for paths that are turned OFF. For the purpose of description herein, a switch can include a semiconductor switching device based on, for example, one or more FETs, MOSFET, SOI-MOSFET, etc. It will be understood that one or more features of the present disclosure can also be implemented with other types of switching devices.

Figure 1:
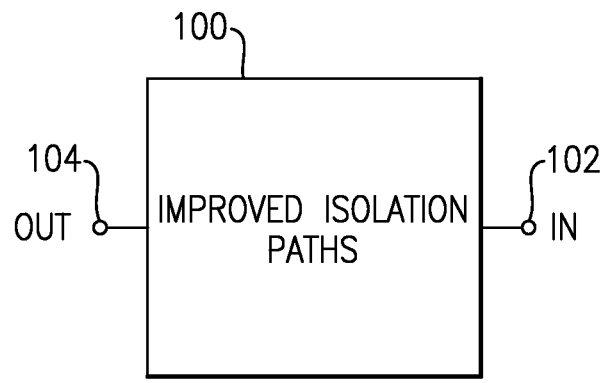
FIG. 1 shows a block diagram of an assembly of radio-frequency (RF) signal paths having improved isolation performance.

FIG. 1 shows a block diagram of an assembly of radio-frequency (RF) signal paths (100) having improved isolation performance. Such an assembly of signal paths can be configured to receive an RF signal through a common input 102 (IN), process the RF signal along one or more of a plurality of paths, and yield a processed RF signal through a common output 104 (OUT).

Figure 2:
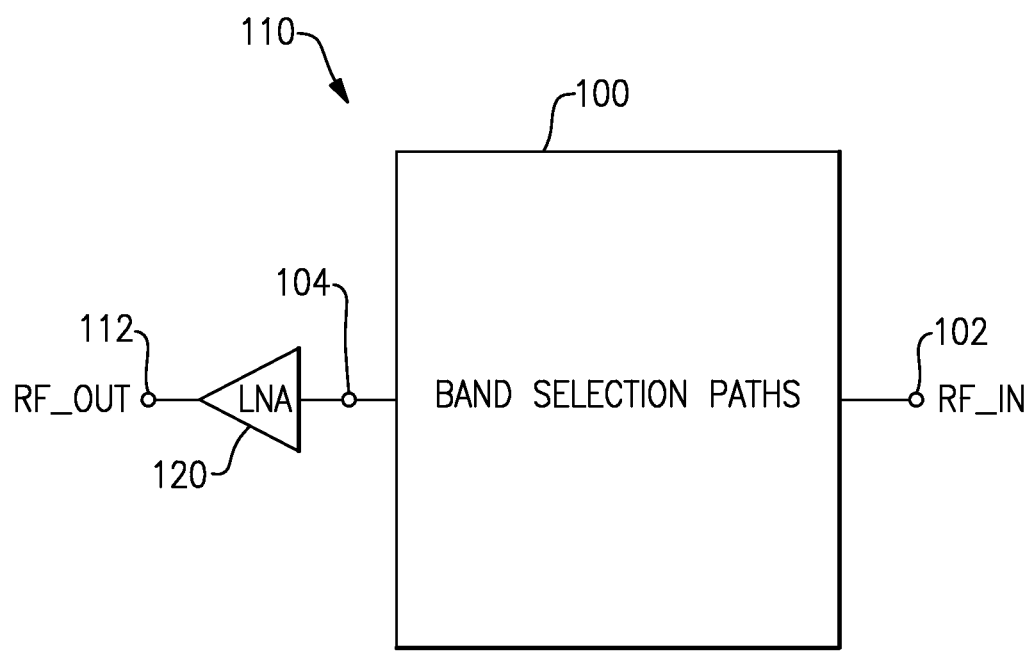
FIG. 2 shows a more specific example of the assembly of RF signal paths of FIG. 1.

FIG. 2 shows a more specific example of the assembly of RF signal paths 100 of FIG. 1. In FIG. 2, a band selection architecture 110 can be implemented for a receiver circuit that includes a low-noise amplifier (LNA) 120. Such an LNA can receive an RF signal that has been band-selected and processed through an assembly of band-selection paths 100. Such an assembly of band-selection paths can be configured to receive an input signal (RF_IN) through an input node 102. Such an input signal can be received through, for example, a common antenna (not shown), and can include one or more cellular band specific frequency components. As described herein, the assembly of band-selection paths 100 can include filters (e.g., band-pass filters) that pass filtered RF signals having selected band content(s) to an output node 104. Such an output node can be coupled to an input of the LNA 120, so as to allow amplification of the selected-band RF signal. Such an amplified RF signal (RF_OUT) is shown to be provided to an LNA output node 112.

Figure 3A:
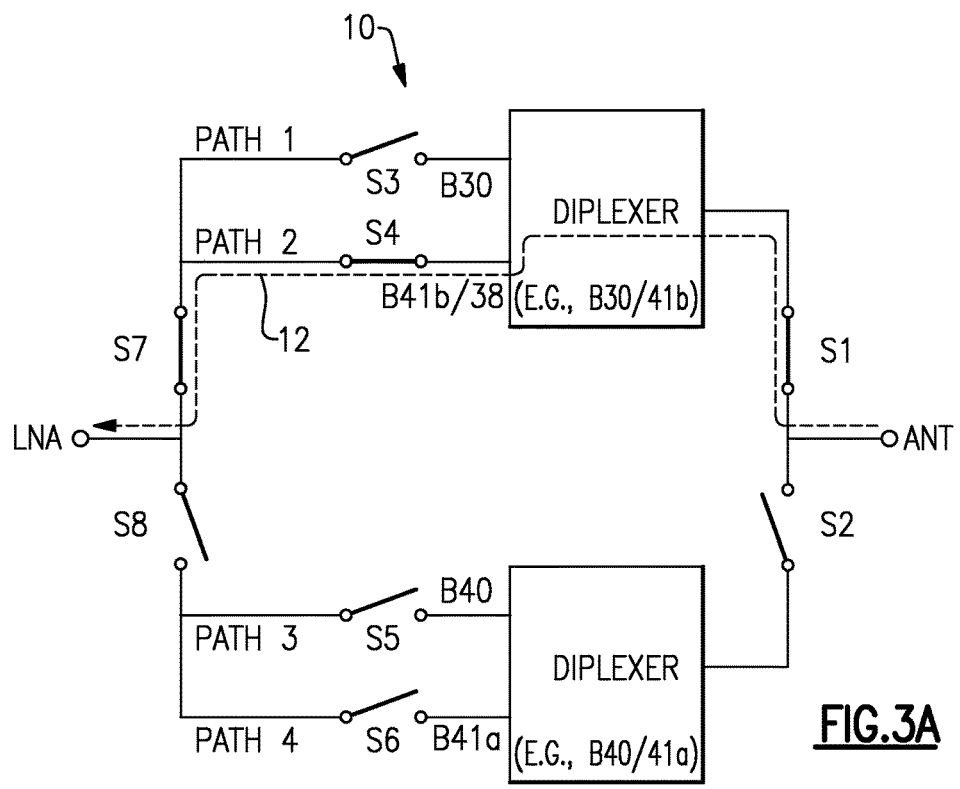
FIGS. 3A and 3B show different paths that can be implemented in an example configuration of band-selection paths involving a plurality of diplexers.
Figure 3B:
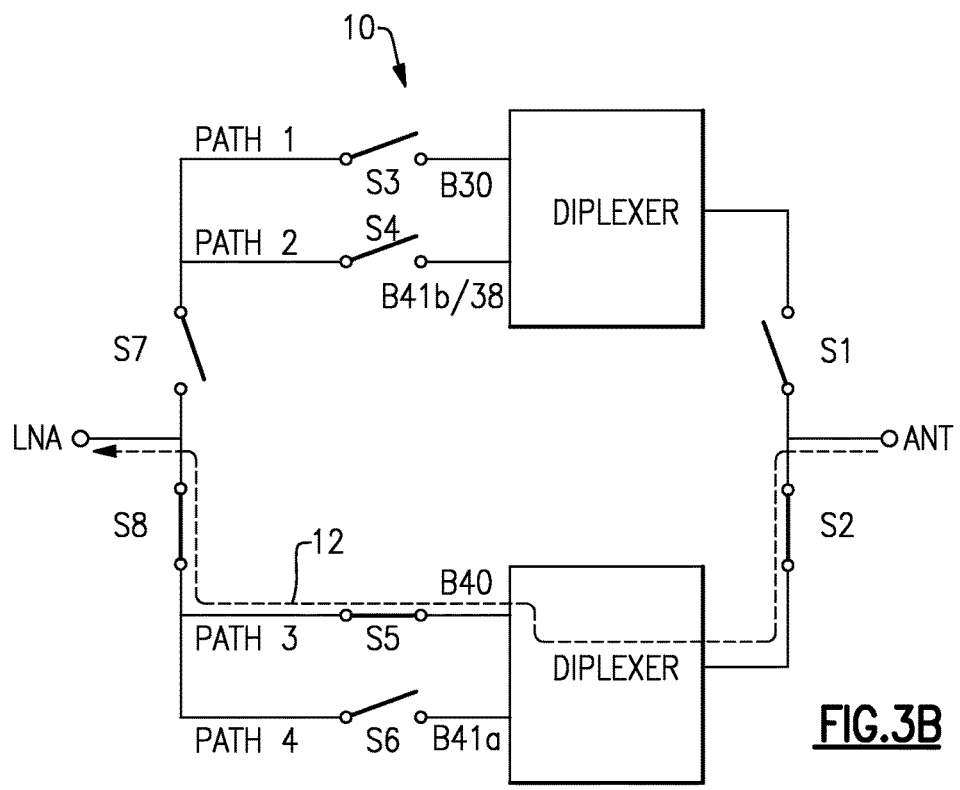

FIGS. 3A and 3B show an example configuration of band-selection paths 10 involving a plurality of diplexers. In the example configuration 10, an RF signal is shown to be received through an antenna port (ANT) and distributed to a first diplexer through a first switched path (with a switch S1), and a second diplexer through a second switched path (with a switch S2). For the purpose of description of FIGS. 3A and 3B, the switches S1 and S2 can be referred to as diplexer selection switches.

Each diplexer is shown to include two output paths, such that the two diplexers collectively have four output ports coupled to their respective paths. Path 1 and Path 2 correspond to the two output ports of the first diplexer, and Path 3 and Path 4 correspond to the two output ports of the second diplexer.

Path 1 is shown to be switchable by a switch S3; Path 2 is shown to be switchable by a switch S4; Path 3 is shown to be switchable by a switch S5; and Path 4 is shown to be switchable by a switch S6. For the purpose of description of FIGS. 3A and 3B, the switches S3-S6 can be referred to as diplexer output path selection switches, or as diplexer port selection switches.

The two paths (Path 1 and Path 2) corresponding to the first diplexer are shown to be combined, and the combined path is shown to be switchable by an enable switch S7. Similarly, the two paths (Path 3 and Path 4) corresponding to the second diplexer are shown to be combined, and the combined path is shown to be switchable by an enable switch S8. The two combined paths corresponding to the switches S7 and S8 are shown to be further combined so as to yield a common output that leads to an input of an LNA (not shown).

The example distributed network of switchable paths (10) in FIGS. 3A and 3B allows the two paths (Path 1, Path 2) associated with the first diplexer to be enabled together by closing of the first enable switch S7. In such an enabled state, either of Path 1 and Path 2 can be enabled by closing one switch (S3 or S4) and opening the other switch (S4 or S3). Similarly, the two paths (Path 3, Path 4) associated with the second diplexer can be enabled together by closing of the second enable switch S8; and in such an enabled state, either of Path 3 and Path 4 can be enabled by closing one switch (S5 or S6) and opening the other switch (S6 or S5).

The foregoing example of selecting output path for a given diplexer assumes that the network of switchable paths is being operated in a non-carrier aggregation (non-CA) mode. In some embodiments, a given diplexer and its corresponding output paths can be configured to operate in a CA mode. For example, the first diplexer can be operated in a CA mode by closing the first enable switch S7, and closing both of the switches (S3, S4) corresponding to Path 1 and Path 2. In such a mode, the second enable switch S8 and both of the switches S5, S6 can be opened. Similarly, the second diplexer can be operated in a CA mode by closing the second enable switch S8, and closing both of the switches (S5, S6) corresponding to Path 3 and Path 4. In such a mode, the first enable switch S7 and both of the switches S3, S4 can be opened.

In the context of non-CA mode of operation, or in situations where selection of a given output path from the diplexer is desired (whether or not the configuration is CA capable), switching configurations as listed in Table 1 can be implemented.

TABLE 1

| Enabled path | S1 | S2 | S3 | S4 | S5 | S6 | S7 | S8 |
|---|---|---|---|---|---|---|---|---|
| Path 1 | ON | OFF | ON | OFF | OFF | OFF | ON | OFF |
| Path 2 | ON | OFF | OFF | ON | OFF | OFF | ON | OFF |
| Path 3 | OFF | ON | OFF | OFF | ON | OFF | OFF | ON |
| Path 4 | OFF | ON | OFF | OFF | OFF | ON | OFF | ON |

In the example of FIG. 3A, Path 2 corresponding to the first diplexer is enabled by the switching configuration as shown and listed in Table 1 to thereby yield a signal path 12. In the example of FIG. 3B, Path 3 corresponding to the second diplexer is enabled by the switching configuration as shown and listed in Table 1 to thereby yield a signal path 12.

In the example of FIG. 3A, the enabled Path 2 results in switches S1, S4 and S7 being closed, and all other switches being opened. Accordingly, isolation between the ANT node and the LNA node includes one open switch (S3) through the disabled Path 1, three open switches (S2, S5, S8) through the disabled Path 3, and three open switches (S2, S6, S8) through the disabled Path 4.

Similarly, in the example of FIG. 3B, the enabled Path 3 results in switches S2, S5 and S8 being closed, and all other switches being opened. Accordingly, isolation between the ANT node and the LNA node includes three open switches (S1, S3, S7) through the disabled Path 1, three open switches (S1, S4, S7) through the disabled Path 2, and one open switch (S6) through the disabled Path 4.

Based on the foregoing examples, one can see that whenever a given path is enabled, at least one disabled path between the input node (ANT) and the output node (LNA) has only one open switch. For example, enabling of Path 2 in FIG. 3A results in the path which includes Path 1 to have only one switch (S3) open for the isolation of the band corresponding to Path 1 between the ANT node and the LNA node. In another example, enabling of Path 3 in FIG. 3B results in the path which includes Path 4 to have only one switch (S6) open for the isolation of the band corresponding to Path 4 between the ANT node and the LNA node.

Figure 4:
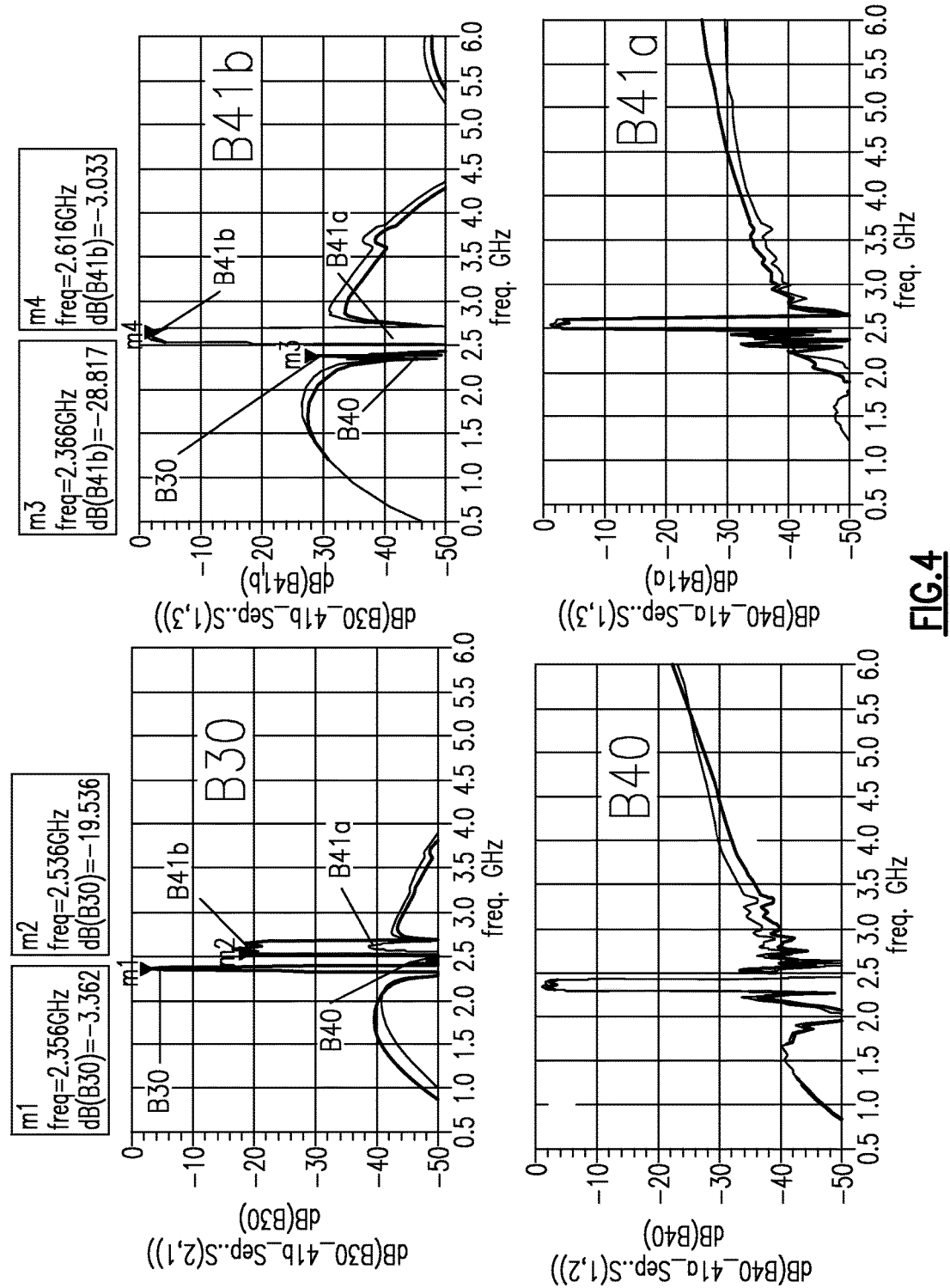
FIG. 4 shows spectrum responses for the four example enabled paths of FIGS. 3A and 3B.

In FIGS. 3A and 3B, examples of bands that can be serviced by the diplexers are shown. The first diplexer can be configured to provide diplexing functionality for example cellular bands B30 and B41*b*/38, and the second diplexer can be configured to provide diplexing functionality for example cellular bands B40 and B41*a*. In the context of such example bands, FIG. 4 shows spectrum responses for the four different enabled paths as described in reference to Table 1. The upper left panel shows power spectra for the bands B30, B41*b*/38, B40 and B41*a* when the path corresponding to B30 (Path 1) is enabled, and the path for B41*b*/38 (Path 2) has only one open switch (S4). The upper right panel shows power spectra for the bands B30, B41*b*/38, B40 and B41*a* when the path corresponding to B41*b* (Path 2) is enabled, and the path for B30 (Path 1) has only one open switch (S3). The lower left panel shows power spectra for the bands B30, B41*b*/38, B40 and B41*a* when the path corresponding to B40 (Path 3) is enabled, and the path for B41*a* (Path 4) has only one open switch (S6). The lower right panel shows power spectra for the bands B30, B41*b*/38, B40 and B41*a* when the path corresponding to B41*a* (Path 4) is enabled, and the path for B40 (Path 3) has only one open switch (S5).

As shown in the upper left panel (B30 enabled, B41*b*/38 with only one open switch, each of B40 and B41*a* with three open switches), the gain for B41*b*/38 (about −20 dB) is much greater than those for B40 and B41*a*. As shown in the lower left panel (B40 enabled, B41*a* with only one open switch, each of B30 and B41*b*/38 with three open switches), gain for B41*b*/38 is reduced to about −34 dB which is a significant reduction from the −20 dB example of the upper left panel. The improvement in isolation of B41*b*/38 in the lower left panel is at least in part due to the three open switches compared to only one open switch in the upper left panel.

Similarly, in the upper right panel (B41*b*/38 enabled, B30 with only one open switch, each of B40 and B41*a* with three open switches), the gain for B30 (about −28 dB) is much greater than those for B40 and B41*a*. As shown in the lower left panel (B40 enabled, B41*a* with only one open switch, each of B30 and B41*b*/38 with three open switches), gain for B30 is reduced to about −38 dB which is a significant reduction from the −28 dB example of the upper right panel. The improvement in isolation of B30 in the lower left panel is at least in part due to the three open switches compared to only one open switch in the upper right panel.

Figure 5:
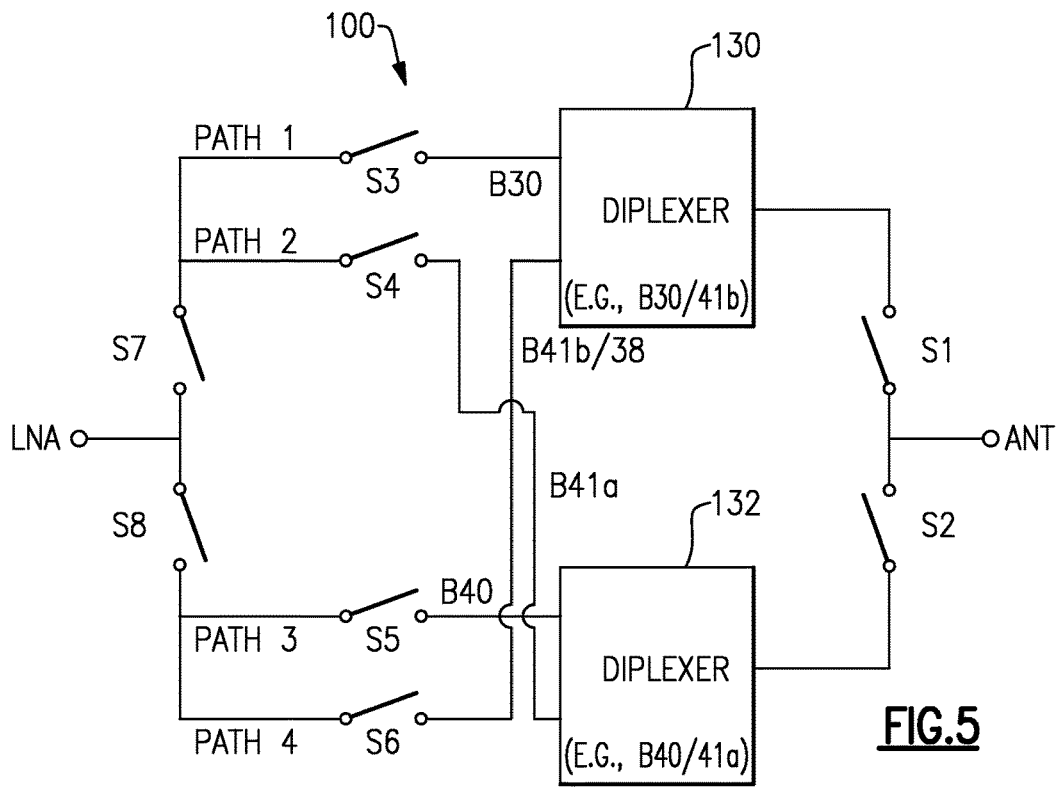
FIG. 5 shows an example of a distributed network of RF signal paths that can provide improved isolation for at least some of the disabled paths.
Figure 6:
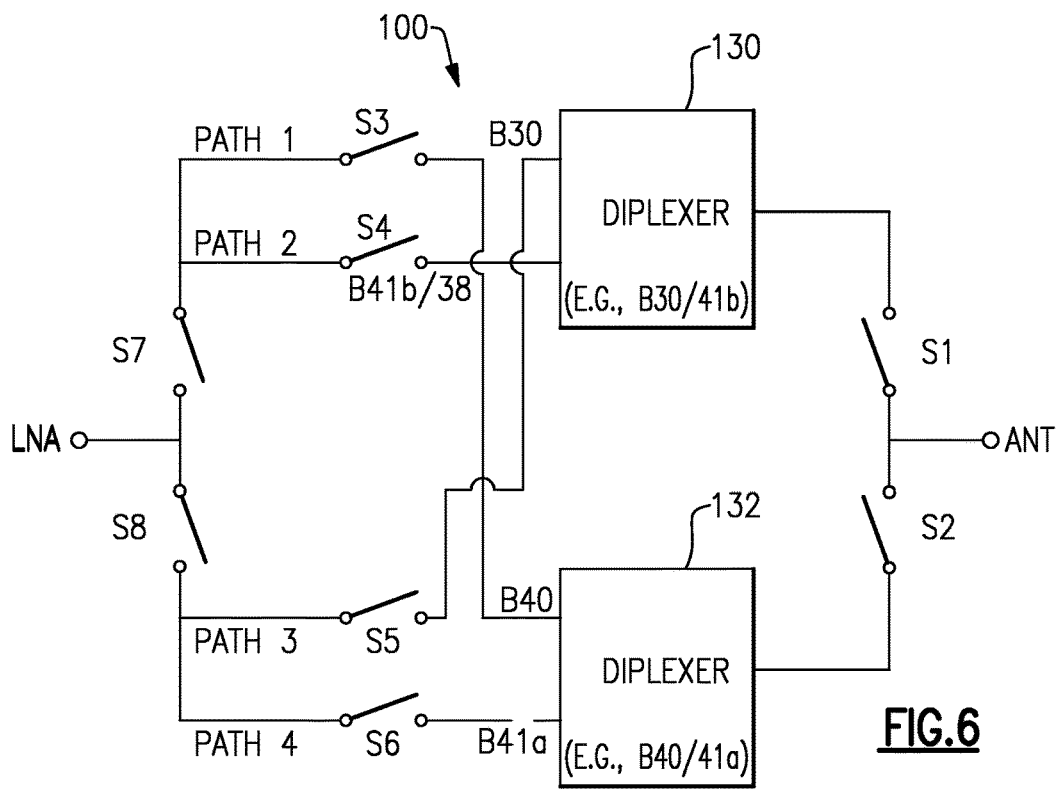
FIG. 6 shows another example of a distributed network of RF signal paths that can provide improved isolation for at least some of the disabled paths.

FIGS. 5 and 6 show examples of distributed networks of RF signal paths 100 that can provide improved isolation for one or more disabled paths than the example of FIGS. 3A and 3B. In FIGS. 5 and 6, the same switches S1-S8 as in FIGS. 3A and 3B can be utilized to provide various switchable signal paths through two example diplexers 130, 132. However, the examples of FIGS. 5 and 6 can have such signal paths configured so that any disabled path between an antenna node (ANT) and an LNA node (LNA) includes at least two open switches (instead of only one open switch in certain paths in FIGS. 3A and 3B). As described herein, such an increase in the number of open switches provides improvements in isolation for the corresponding disabled paths. As also described herein, such improvements in isolation for the disabled paths can be achieved utilizing the same overall number of switches.

In the example configurations 100 of FIGS. 5 and 6, an RF signal is shown to be received through an antenna port (ANT) and distributed to a first diplexer 130 through a first switched path (with a switch S1), and to a second diplexer 132 through a second switched path (with a switch S2). For the purpose of description of FIGS. 5 and 6, the switches S1 and S2 can be referred to as diplexer selection switches.

Each diplexer is shown to include two output ports, such that the two diplexers collectively have four output ports coupled to their respective paths through respective switches. In the example of FIG. 5, Path 1 and Path 4 are coupled to the two output ports of the first diplexer 130 through switches S3 and S6, respectively, and Path 3 and Path 2 are coupled to the two output ports of the second diplexer 132 through switches S5 and S4, respectively. In the example of FIG. 6, Path 3 and Path 2 are coupled to the two output ports of the first diplexer 130 through switches S5 and S4, respectively, and Path 1 and Path 4 are coupled to the two output ports of the second diplexer 132 through switches S3 and S6, respectively.

In both of the examples of FIGS. 5 and 6, Path 1 is shown to be switchable by a switch S3; Path 2 is shown to be switchable by a switch S4; Path 3 is shown to be switchable by a switch S5; and Path 4 is shown to be switchable by a switch S6. For the purpose of description of FIGS. 5 and 6, the switches S3-S6 can be referred to as diplexer output path selection switches, or diplexer port selection switches.

In the example of FIG. 5, Path 1 corresponding to the first diplexer 130 and Path 2 corresponding to the second diplexer 132 are shown to be combined, and the combined path is shown to be switchable by an enable switch S7. Similarly, Path 3 corresponding to the second diplexer 132 and Path 4 corresponding to the first diplexer 130 are shown to be combined, and the combined path is shown to be switchable by an enable switch S8. The two combined paths corresponding to the switches S7 and S8 are shown to be further combined so as to yield a common output that leads to an input of an LNA (not shown).

In the example of FIG. 6, Path 1 corresponding to the second diplexer 132 and Path 2 corresponding to the first diplexer 130 are shown to be combined, and the combined path is shown to be switchable by an enable switch S7. Similarly, Path 3 corresponding to the first diplexer 130 and Path 4 corresponding to the second diplexer 132 are shown to be combined, and the combined path is shown to be switchable by an enable switch S8. The two combined paths corresponding to the switches S7 and S8 are shown to be further combined so as to yield a common output that leads to an input of an LNA (not shown).

The example distributed networks of switchable paths of FIGS. 5 and 6 allow the two paths (Path 1, Path 2) associated with two different diplexers to be enabled together by closing of the first enable switch S7. In such an enabled state, either of Path 1 and Path 2 can be enabled by closing one switch (S3 or S4) and opening the other switch (S4 or S3). Similarly, the two paths (Path 3, Path 4) associated with two different diplexers can be enabled together by closing of the second enable switch S8; and in such an enabled state, either of Path 3 and Path 4 can be enabled by closing one switch (S5 or S6) and opening the other switch (S6 or S5).

The foregoing examples of selecting an output path for a given diplexer assumes that the network of switchable paths is being operated in a non-carrier aggregation (non-CA) mode. In some embodiments, a given diplexer and its corresponding output paths can be configured to operate in a CA mode. For example, in FIG. 5, the first diplexer 130 can be operated in a CA mode by closing both of the first and second enable switches (S7, S8), and closing both of the switches (S3, S6) corresponding to Path 1 and Path 4. In such a mode, both of the first and second diplexer selection switches (S1, S2) can be closed. In another example, in FIG. 6, the first diplexer 130 can be operated in a CA mode by closing both of the first and second enable switches (S7, S8), and closing both of the switches (S5, S4) corresponding to Path 3 and Path 2. In such a mode, both of the first and second diplexer selection switches (S1, S2) can be closed.

In the context of non-CA mode of operation, or in situations where selection of a given output path from the diplexer is desired (whether or not the configuration is CA capable), switching configurations as listed in Table 2 can be implemented for the example of FIG. 5, and as listed in Table 3 for the example of FIG. 6.

TABLE 2

| Enabled path | S1 | S2 | S3 | S4 | S5 | S6 | S7 | S8 |
|---|---|---|---|---|---|---|---|---|
| Path 1 | ON | OFF | ON | OFF | OFF | OFF | ON | OFF |
| Path 2 | OFF | ON | OFF | ON | OFF | OFF | ON | OFF |
| Path 3 | OFF | ON | OFF | OFF | ON | OFF | OFF | ON |
| Path 4 | ON | OFF | OFF | OFF | OFF | ON | OFF | ON |

TABLE 3

| Enabled path | S1 | S2 | S3 | S4 | S5 | S6 | S7 | S8 |
|---|---|---|---|---|---|---|---|---|
| Path 1 | OFF | ON | ON | OFF | OFF | OFF | ON | OFF |
| Path 2 | ON | OFF | OFF | ON | OFF | OFF | ON | OFF |
| Path 3 | ON | OFF | OFF | OFF | ON | OFF | OFF | ON |
| Path 4 | OFF | ON | OFF | OFF | OFF | ON | OFF | ON |

Figure 7A:
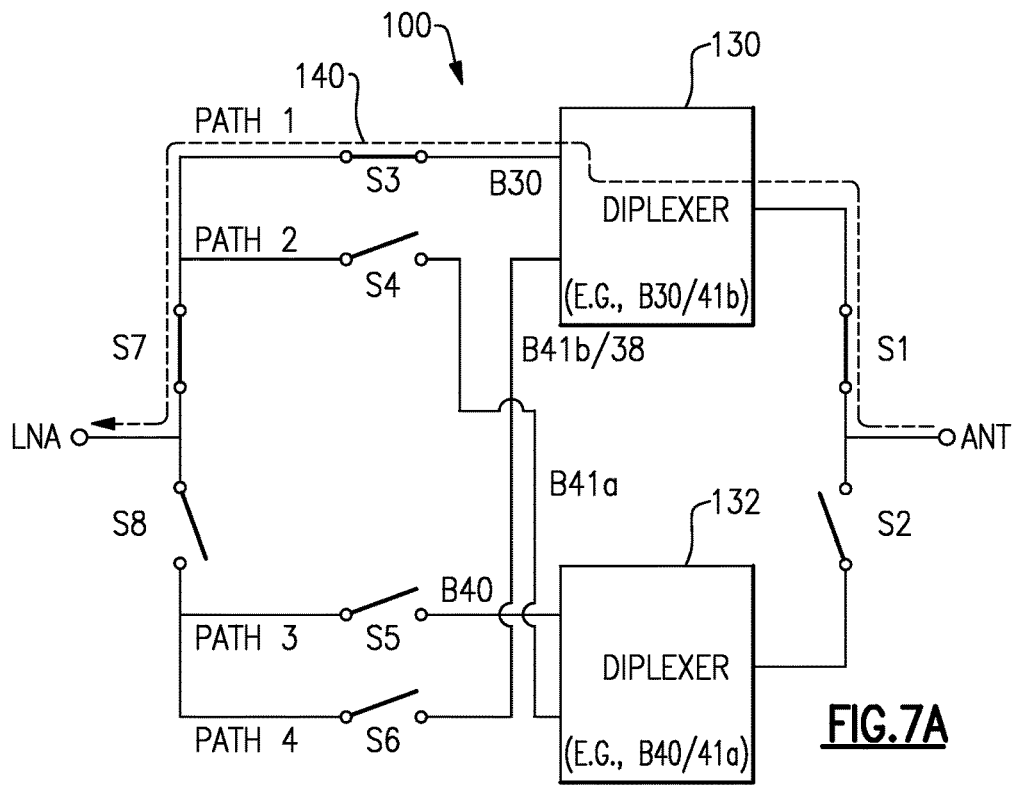
FIGS. 7A-7D show four signal paths that can be enabled for the example configuration of FIG. 5.
Figure 7B:
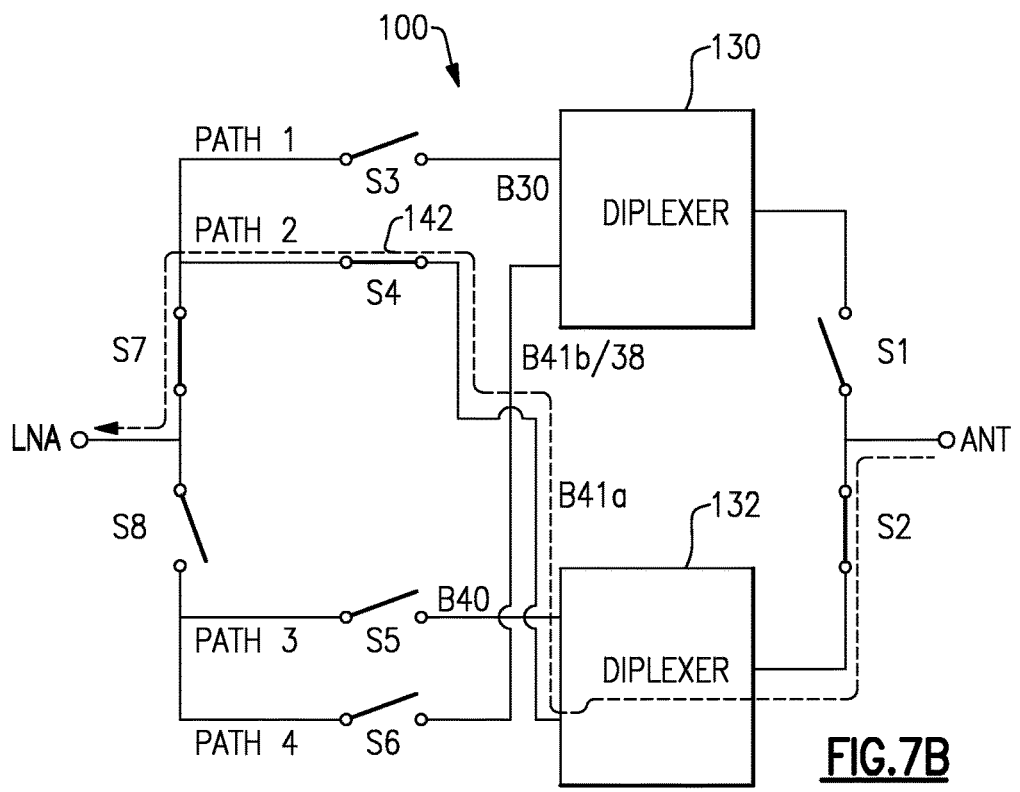
Figure 7C:
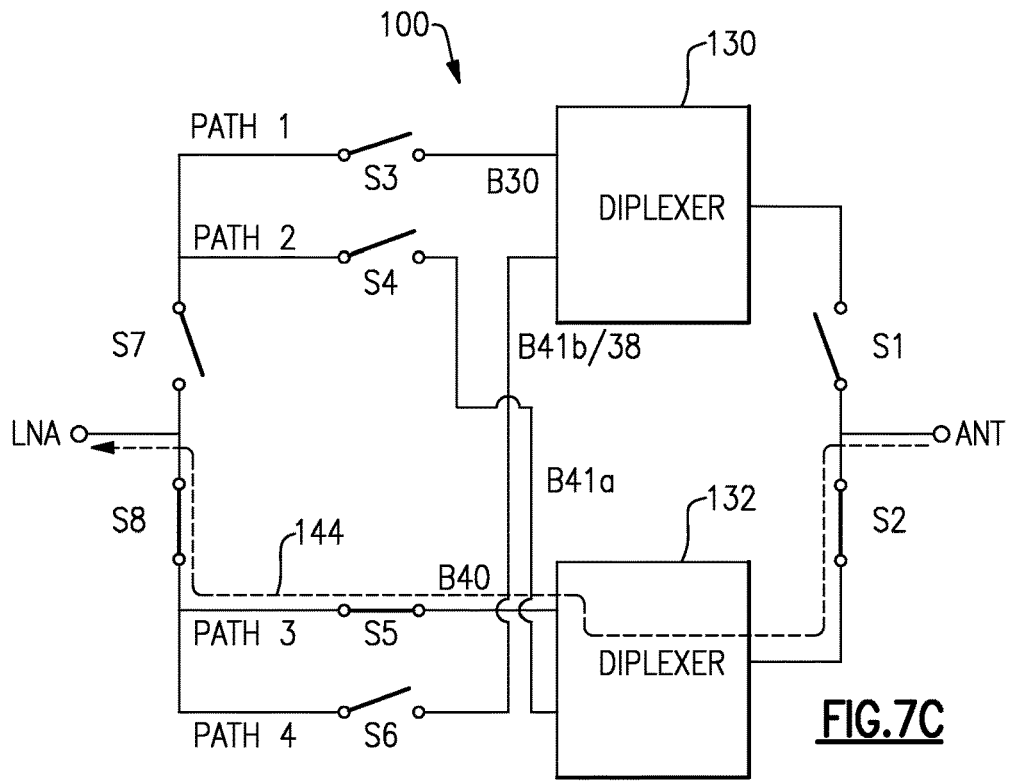
Figure 7D:
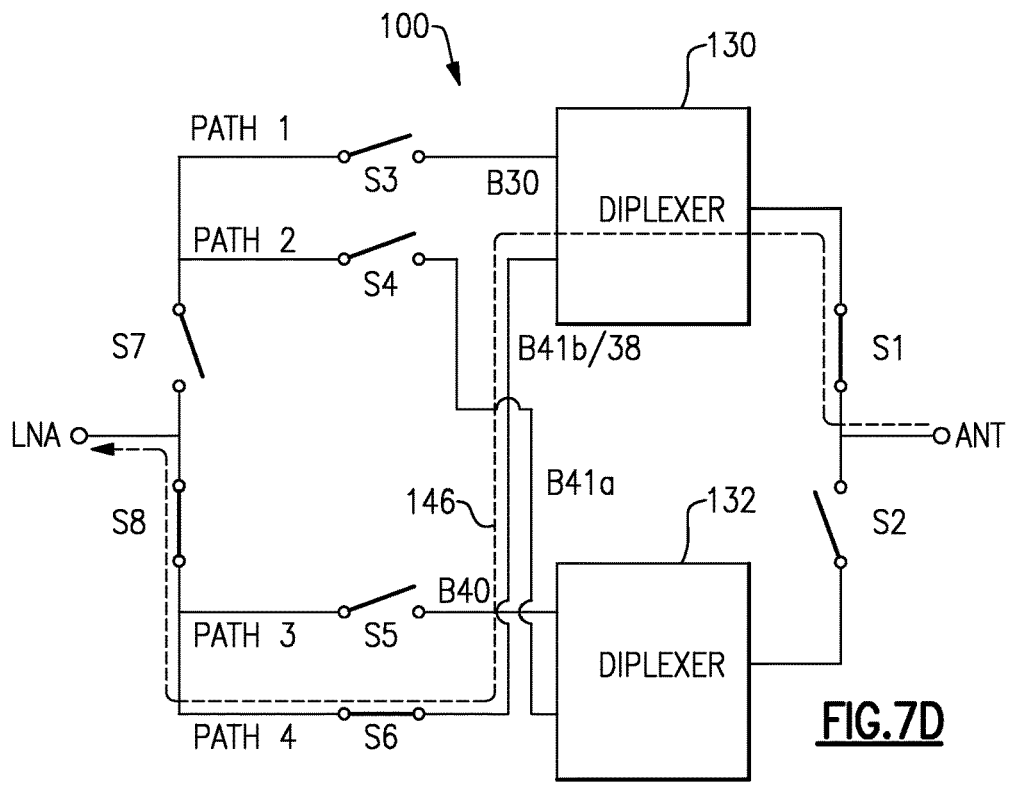

FIGS. 7A-7D show four signal paths that can be enabled for the example configuration of FIG. 5. In the example of FIG. 7A, Path 1 corresponding to the first diplexer 130 is enabled by the switching configuration as shown and listed in Table 2 to thereby yield a signal path 140. In the example of FIG. 7B, Path 2 corresponding to the second diplexer 132 is enabled by the switching configuration as shown and listed in Table 2 to thereby yield a signal path 142. In the example of FIG. 7C, Path 3 corresponding to the second diplexer 132 is enabled by the switching configuration as shown and listed in Table 2 to thereby yield a signal path 144. In the example of FIG. 7D, Path 4 corresponding to the first diplexer 130 is enabled by the switching configuration as shown and listed in Table 2 to thereby yield a signal path 146.

In the example of FIG. 7A, the enabled Path 1 results in switches S1, S3 and S7 being closed, and all other switches being opened. Accordingly, isolation between the ANT node and the LNA node includes two open switches (S2, S4) through the disabled Path 2, three open switches (S2, S5, S8) through the disabled Path 3, and two open switches (S6, S8) through the disabled Path 4.

Similarly, in the example of FIG. 7B, the enabled Path 2 results in switches S2, S4 and S7 being closed, and all other switches being opened. Accordingly, isolation between the ANT node and the LNA node includes two open switches (S1, S3) through the disabled Path 1, two open switches (S5, S8) through the disabled Path 3, and three open switches (S1, S6, S8) through the disabled Path 4.

Similarly, in the example of FIG. 7C, the enabled Path 3 results in switches S2, S5 and S8 being closed, and all other switches being opened. Accordingly, isolation between the ANT node and the LNA node includes three open switches (S1, S3, S7) through the disabled Path 1, two open switches (S4, S7) through the disabled Path 2, and two open switches (S1, S6) through the disabled Path 4.

Similarly, in the example of FIG. 7D, the enabled Path 4 results in switches S1, S6 and S8 being closed, and all other switches being opened. Accordingly, isolation between the ANT node and the LNA node includes two open switches (S3, S7) through the disabled Path 1, three open switches (S2, S4, S7) through the disabled Path 2, and two open switches (S2, S5) through the disabled Path 3.

Based on the foregoing examples related to FIGS. 7A-7D, one can see that whenever a given path is enabled, each of the disabled paths includes at least two open switches between the input node (ANT) and the output node (LNA). Similar enabling of the four paths and the corresponding disabled paths having at least two open switches can be implemented for the example configuration of FIG. 6.

Figure 8:
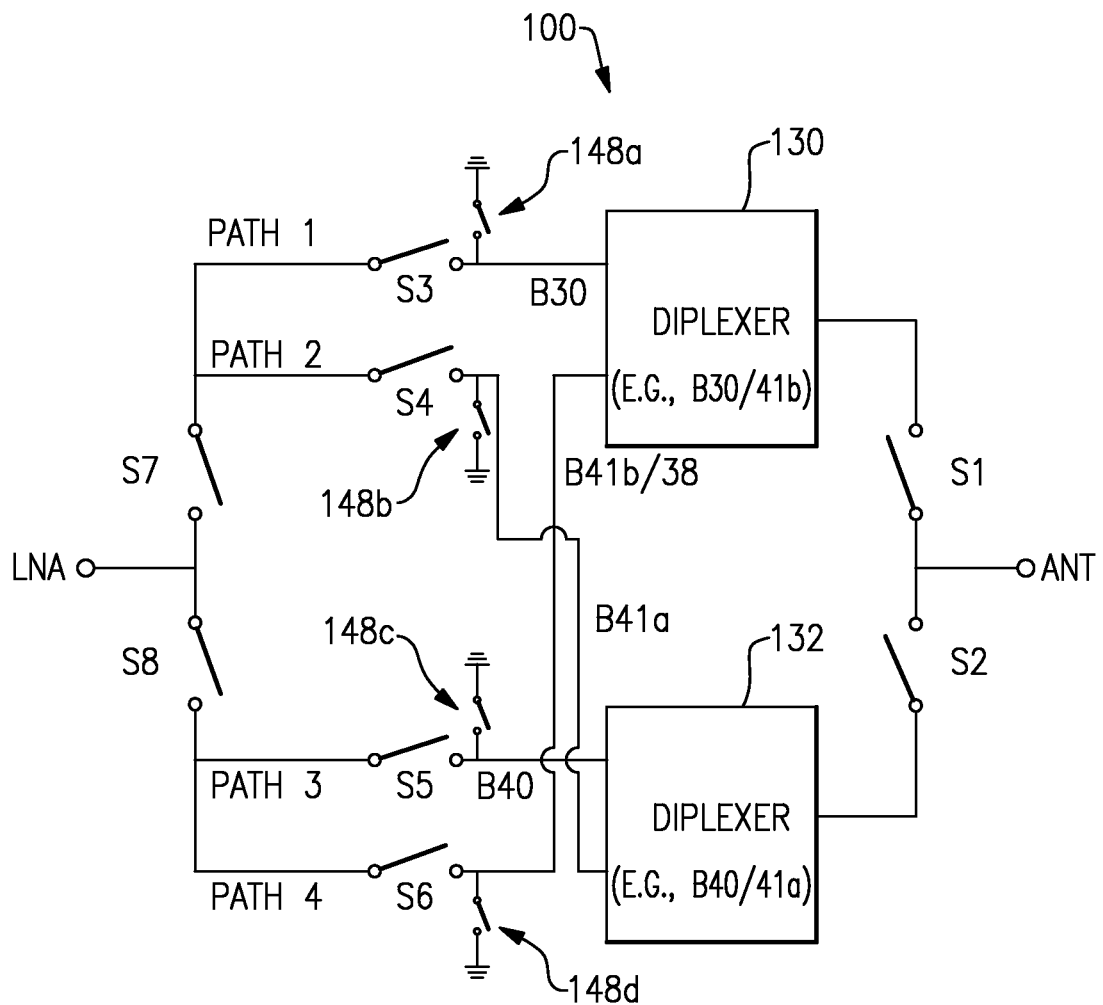
FIG. 8 shows that in some embodiments, a distributed network of signal paths having one or more features as described herein can include shunt paths to facilitate isolation associated with some or all of the signal paths.

FIG. 8 shows that in some embodiments, a distributed network 100 of signal paths having one or more features as described herein can include shunt paths to facilitate isolation associated with some or all of the signal paths. The example shown in FIG. 8 is similar to the example configuration of FIG. 5. However, in FIG. 8, switchable shunt paths (148a, 148b, 148c, 148d) to ground are shown to be provided along the diplexer paths, before their respective switches S3, S4, S5, S6.

In some embodiments, each of the shunt paths (148a, 148b, 148c, 148d) can include a shunt switch, and such a shunt switch can be closed or opened when the switch along the corresponding diplexer output path is opened or closed. For example, when Path 1 is disabled, switch S3 is opened (along with switch S1); and in such a state, the shunt switch for the shunt path 148a can be closed so as to allow any residual signal and/or noise to be shunted to ground. When Path 1 is enabled, switch S3 closed opened (along with switch S1); and in such a state, the shunt switch for the shunt path 148a can be opened. The shunt switches for the shunt paths 148b, 148c, 148d can be operated in a similar manner.

In FIGS. 5-8, examples of bands that can be serviced by the diplexers are shown. The first diplexer 130 can be configured to provide diplexing functionality for example cellular bands B30 and B41b/38, and the second diplexer 132 can be configured to provide diplexing functionality for example cellular bands B40 and B41a. In the context of such example bands, FIG. 9 shows transmitted power spectra for the four different enabled paths as described in reference to Tables 2 and 3.

Figure 9:
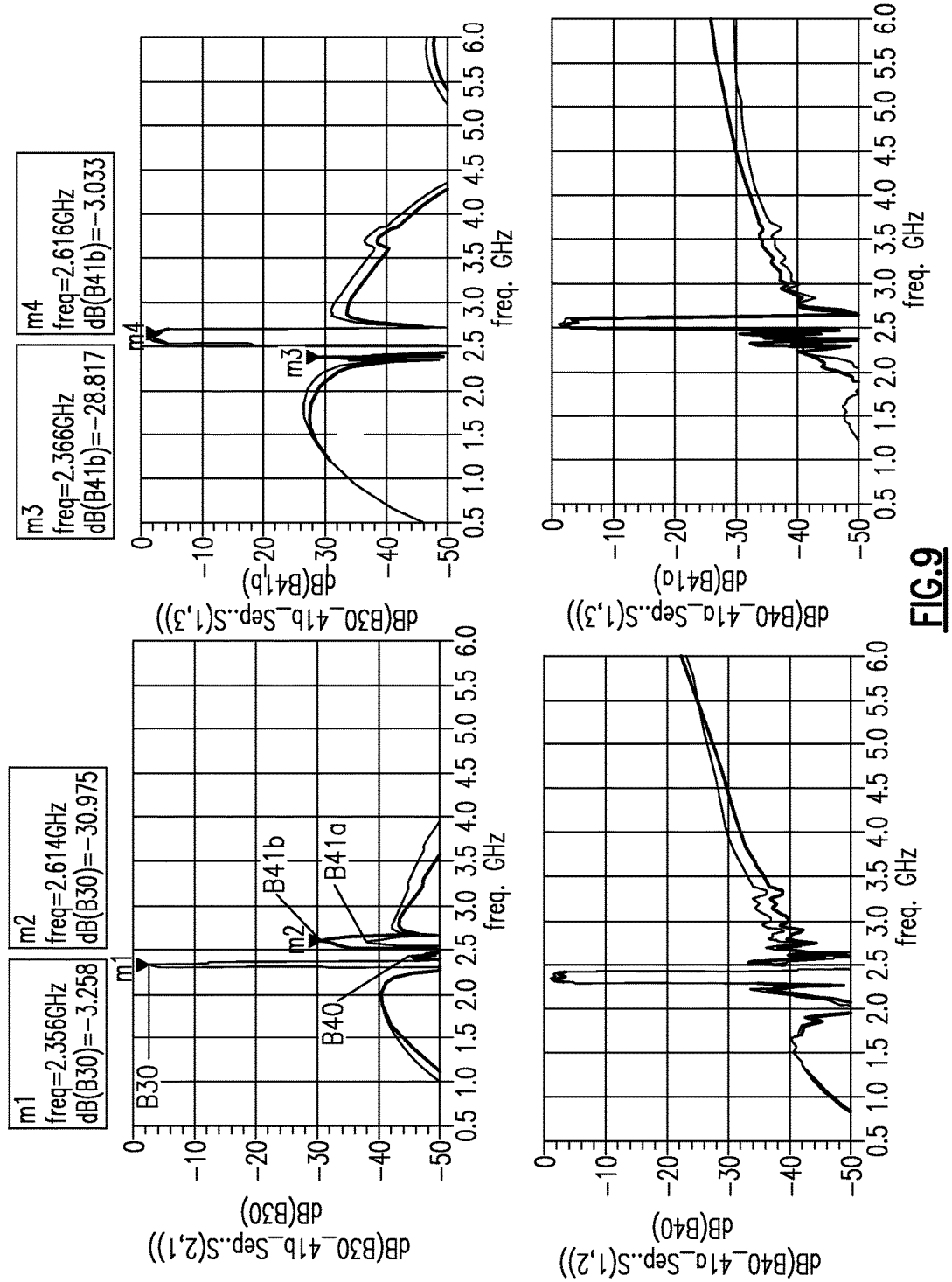
FIG. 9 shows examples of transmitted power spectra for the four different enabled paths of the examples of FIGS. 5 and 6.

The upper left panel in FIG. 9 shows power spectra for the bands B30, B41b/38, B40 and B41a when the path corresponding to B30 (Path 1 in FIG. 5, Path 3 in FIG. 6) is enabled, and the path for B41b/38 has two open switches (S6, S8) in FIG. 5 and two open switches (S4, S7) in FIG. 6. The upper right panel shows power spectra for the bands B30, B41b/38, B40 and B41a when the path corresponding to B41b/38 (Path 4 in FIG. 5, Path 2 in FIG. 6) is enabled, and the path for B30 has two open switches (S3, S7) in FIG. 5 and two open switches (S5, S8) in FIG. 6. Similarly, the lower left panel shows power spectra for the bands B30, B41b/38, B40 and B41a when the path corresponding to B40 is enabled. Similarly, the lower right panel shows power spectra for the bands B30, B41b/38, B40 and B41a when the path corresponding to B41a is enabled.

In the examples described in reference to FIGS. 3 and 4, and more particularly in reference to the upper left panel of FIG. 4, B30 being enabled results in the disabled path for B41b/38 having only one open switch and yielding a relatively poor isolation at about −20 dB. In the upper left panel of FIG. 9 where B30 is enabled and the disabled path for B41b/38 includes two open switches, the isolation for B41b/38 is shown to be at a significantly improved level of about −31 dB. Compared to the one-open-switch example of FIG. 4, the isolation provided by the two-open-switches example of FIG. 9 is improved by about 9 dB.

In the examples of FIGS. 5-8, improved isolation can be achieved by forming output paths of a given diplexer to two separate enable switches. When there are only two diplexers, such a configuration essentially results in swapping of one output path of the first diplexer with one output path of the second diplexer. When there are more than two diplexers, such swapping can be implemented between pair(s) of diplexers, among different diplexers, or some combination thereof.

Figure 10:
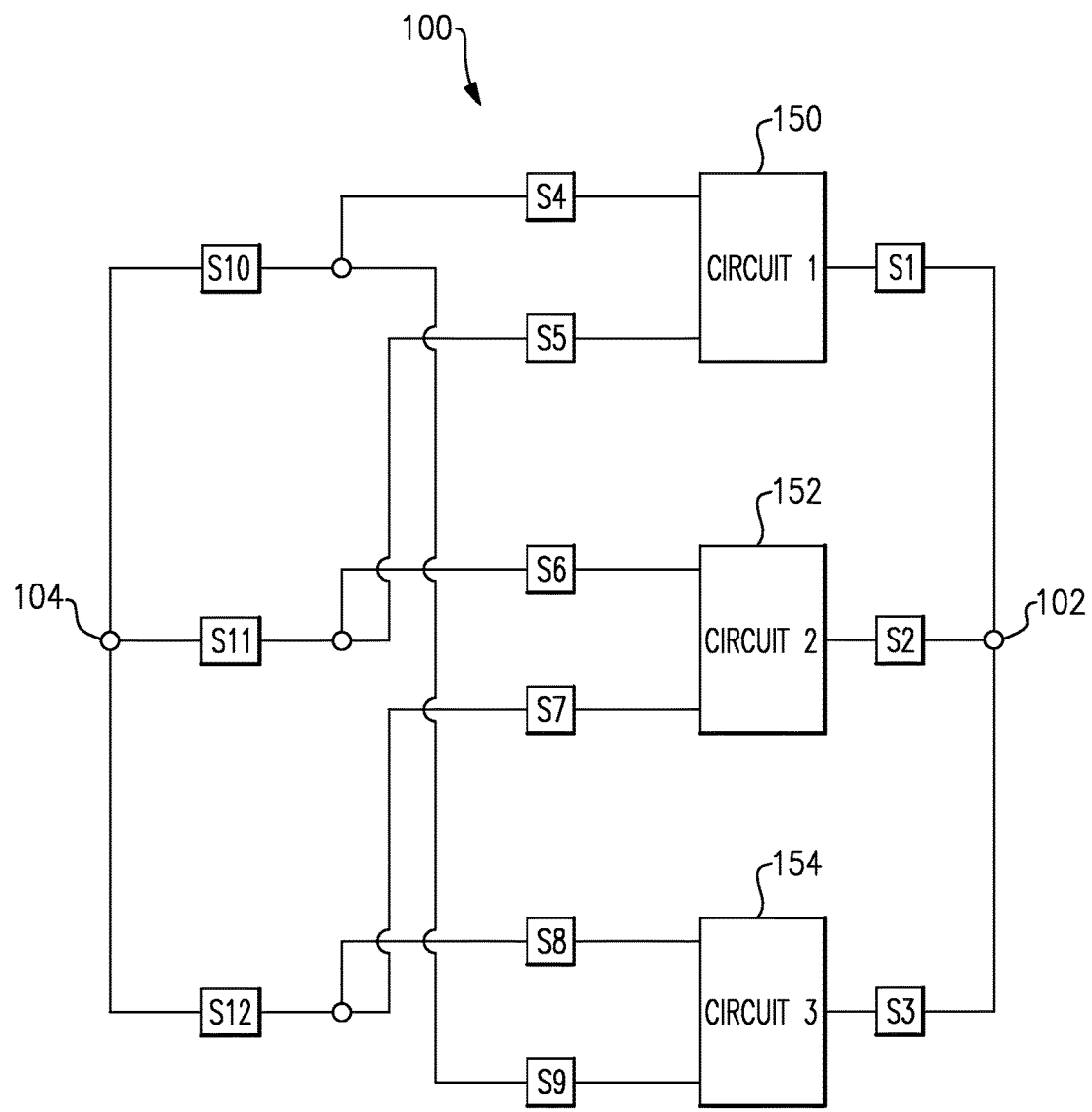
FIG. 10 shows that in some embodiments, a distributed network of signal paths can be implemented with more than two diplexers.

For example, FIG. 10 shows a distributed network of signal paths 100 that includes three signal conditioning circuits 150, 152, 154 such as diplexers. Switches S1, S2, S3 are shown to couple the circuits 150, 152, 154 to a common node 102. In the context of diplexers, the switches S1, S2, S3 can be diplexer-selection switches. Switches S4, S5, S6, S7, S8, S9 are show to provide switchable paths coupled to the other sides of the circuits 150, 152, 154. In the context of diplexers, the switches S4, S5, S6, S7, S8, S9 can provide switchable output paths for the three diplexers. The switches S4, S5, S6, S7, S8, S9 are shown to be combined in various pairs to form three combined paths. The three combined paths are shown to provide switchable paths to a common node 104 through switches S10, S11, S12. In the context of diplexers, the switches S10, S11, S12 can be enable switches.

As with the various examples of FIGS. 5-8, disabled signal paths between the node 102 and the node 104 of FIG. 10 can benefit from having at least two open switches. In FIG. 10, however, the example configuration 100 shows that the distribution of paths from a pair of diplexers (e.g., circuits 150, 152) do not necessarily need to be coupled to two corresponding enable switches (e.g., S10, S11). For example, the output paths from the first diplexer are shown to be coupled to the first and second enable switches S10, S11 through their respective switches S4, S5; and the output paths from the second diplexer are shown to be coupled to the second enable switch S11 and the third enable switch S12 (instead of the first enable switch S10) through their respective switches S6, S7. Similarly, the output paths from the third diplexer are shown to be coupled to the third enable switch S12 and the first enable switch S10 through their respective switches S8, S9.

Figure 11:
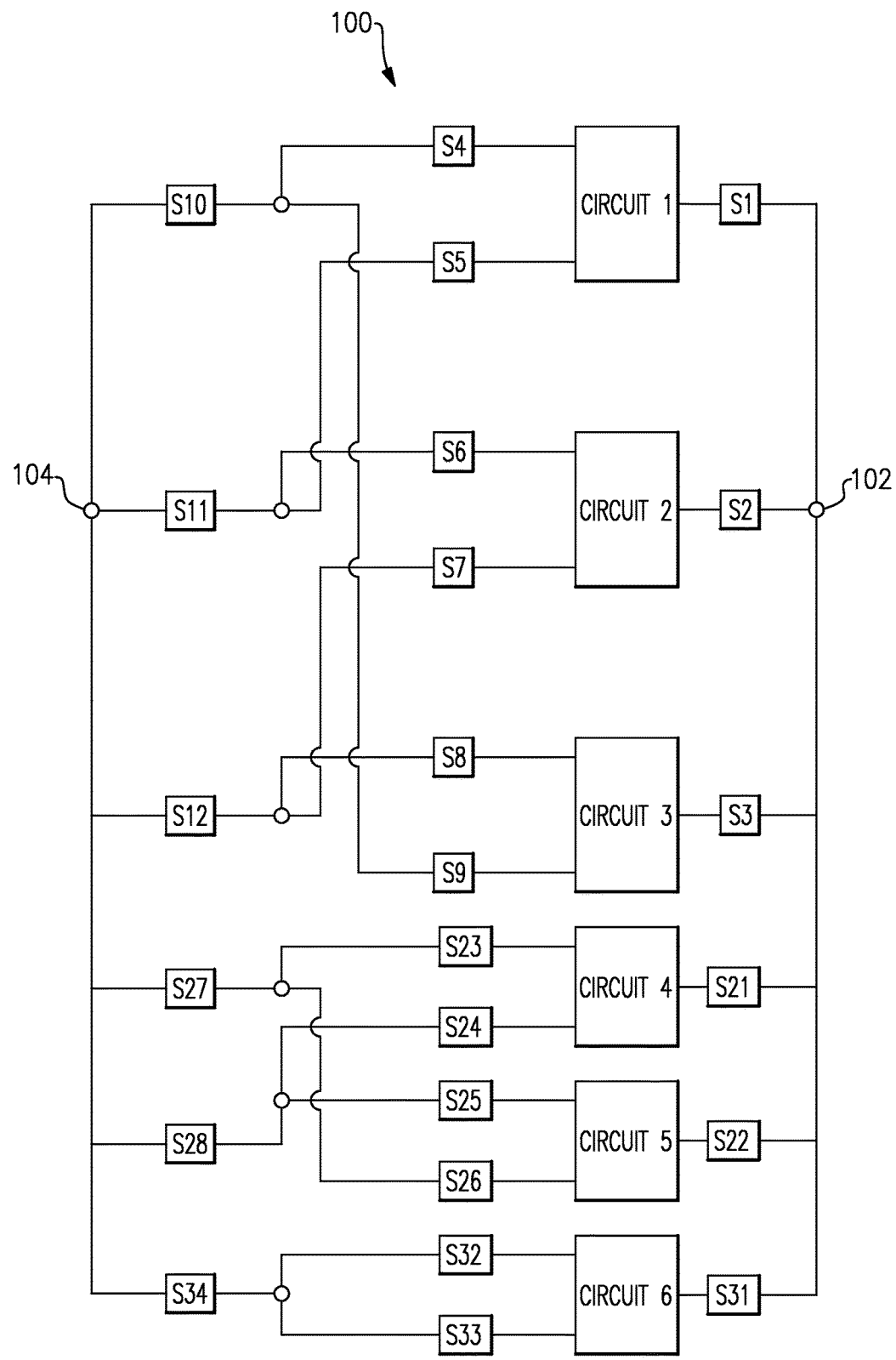
FIG. 11 shows that in some embodiments, a distributed network of signal paths between two common nodes does not necessarily need to have all of the paths configured with enhanced isolation as described herein.

FIG. 11 shows that in some embodiments, a distributed network of signal paths 100 between two common nodes 102 does not necessarily need to have all of the paths configured as described herein in reference to FIGS. 5-8 and 10. In the example of FIG. 11, paths associated with Circuit 1, Circuit 2 and Circuit 3 are similar to the example of FIG. 10; paths associated with Circuit 4 and Circuit 5 are similar to the examples of FIGS. 5-8; and paths associated with Circuit 6 are similar to the examples of FIG. 3. Paths such as those associated with Circuit 6 can be implemented in situations where, for example, band paths are not sensitive to isolation performance.

In the examples described herein in reference to FIGS. 5-11, various distributed networks of signal paths can be viewed as having three layers of switches. For example, diplexer selection switches (e.g., S1 and S2 in FIGS. 5-8) can be a layer, port selection switches (e.g., S3-S6) can be a layer, and enable switches (e.g., S7 and S8) can be a layer. It will be understood that one or more features of the present disclosure can also be implemented in systems having different numbers of switch layers.

In some embodiments, switches in such different layers can have different isolation properties. Accordingly, such differences in isolation properties can be utilized when distributing the signal paths to yield desired isolation performance for some or all of the signal paths.

In some embodiments, switches within a given layer can have different isolation properties, or alternatively, different diplexer channels can have different isolation properties. Accordingly, such differences in isolation properties can be utilized when distributing the signal paths to yield desired isolation performance for some or all of the signal paths.

In various examples herein, distributed network of signal paths are described in the context of diplexers. However, it will be understood that one or more features of the present disclosure can be implemented with other signal conditioning circuits, including, for example, multiplexers. Also, the diplexer examples are described in the context of a single common node being an input, and the two diplexed nodes being the outputs. However, it will be understood that diplexers can be operated in reverse, such that the distributed paths are on the output side.

Figure 12:
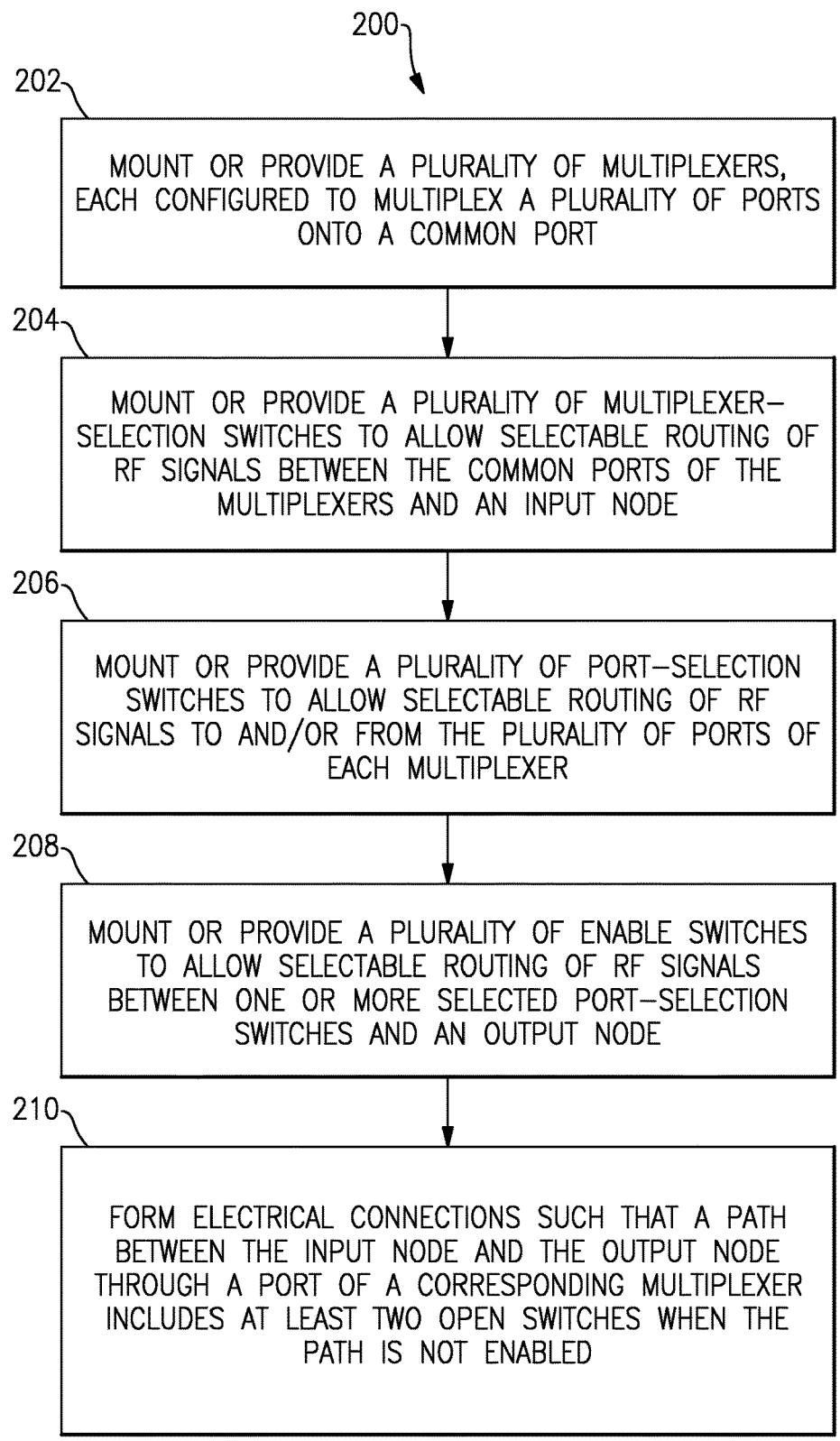
FIG. 12 shows a process that can be implemented to fabricate a device such as a module having one or more features as described herein.

FIG. 12 shows a process 200 that can be implemented to fabricate a device such as a module having one or more features as described herein. In block 202, a plurality of multiplexers can be mounted or provided on a substrate such as a packaging substrate. Such multiplexers can include, for example, diplexers. Each multiplexer can be configured to multiplex a plurality of ports onto a common port.

In block 204, a plurality of multiplexer-selection switches can be mounted or provided to allow selectable routing of RF signals between the common ports of the multiplexers and an input node. In block 206, a plurality of port-selection switches can be mounted or provided to allow selectable routing of RF signals to and/or from the plurality of ports of each multiplexer. In block 208, a plurality of enable switches can be mounted or provided to allow selectable routing of RF signals between one or more selected port-selection switches and an output node. In block 210, electrical connections can be formed such that a path between the input node and the output node through a port of a corresponding multiplexer includes at least two open switches when the path is not enabled.

Figure 13:
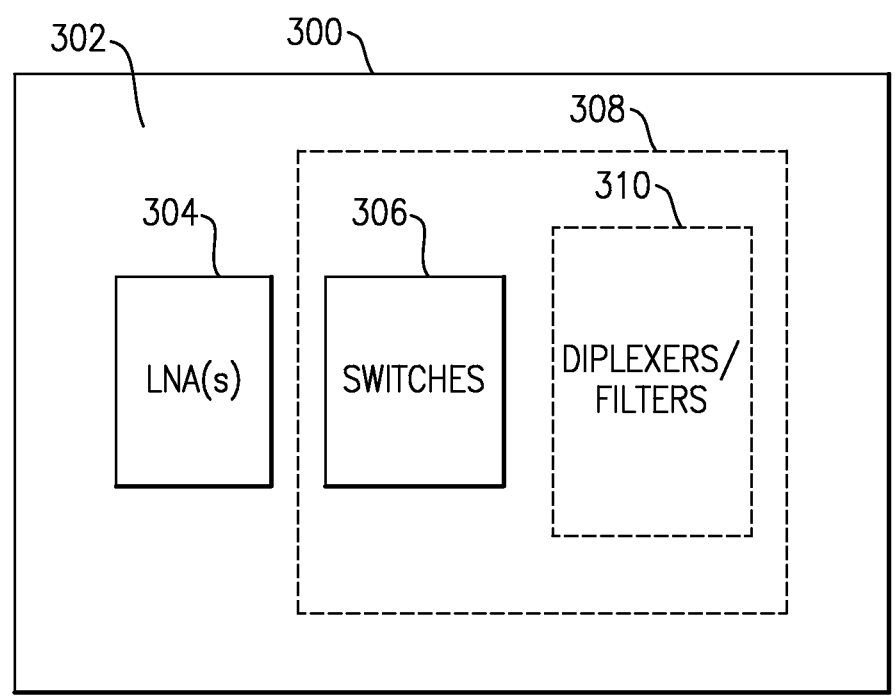
FIG. 13 shows that one or more features of the present disclosure can be implemented in an RF module.

In some embodiments, one or more features of the present disclosure can be implemented in a number of products. For example, FIG. 13 shows a block diagram of an RF module 300 (e.g., a front-end module) having a packaging substrate 302 such as a laminate substrate. Such a module can include one or more LNAs; and in some embodiments, such LNA(s) can be implemented on a semiconductor die 304. An LNA implemented on such a die can be configured to receive RF signals through selected signal paths as described herein. Such an LNA can also benefit from the one or more advantageous features associated with improved isolation associated with disabled signal paths.

The module 300 can further include a plurality of switches implemented on one or more semiconductor die 306. Such switches can be configured to provide the various switching functionalities as described herein, including providing improved isolation by having an increased number of open switches in selected disabled signal paths.

The module 300 can further include a plurality of diplexers and/or filters (collectively indicated as 310) configured to process RF signals. Such diplexers/filters can be implemented as surface-mount devices (SMDs), as part of an integrated circuit (IC), of some combination thereof. Such diplexers/filters can include or be based on, for example, SAW filters, and can be configured as high Q devices.

In FIG. 13, a distributed network of signal paths is collectively indicated as 308. Such a network of signal paths can include one or more features as described herein to provide, among others, improved isolation between an antenna port (not shown) and an LNA port. In some embodiments, some or all of the network of signal paths can be implemented as or be facilitated by conductor traces on or within the packaging substrate, conductor features on or within semiconductor die, wirebonds, or any combination thereof.

In some implementations, an architecture, device and/or circuit having one or more features described herein can be included in an RF device such as a wireless device. Such an architecture, device and/or circuit can be implemented directly in the wireless device, in one or more modular forms as described herein, or in some combination thereof. In some embodiments, such a wireless device can include, for example, a cellular phone, a smart-phone, a hand-held wireless device with or without phone functionality, a wireless tablet, a wireless router, a wireless access point, a wireless base station, etc. Although described in the context of wireless devices, it will be understood that one or more features of the present disclosure can also be implemented in other RF systems such as base stations.

Figure 14:
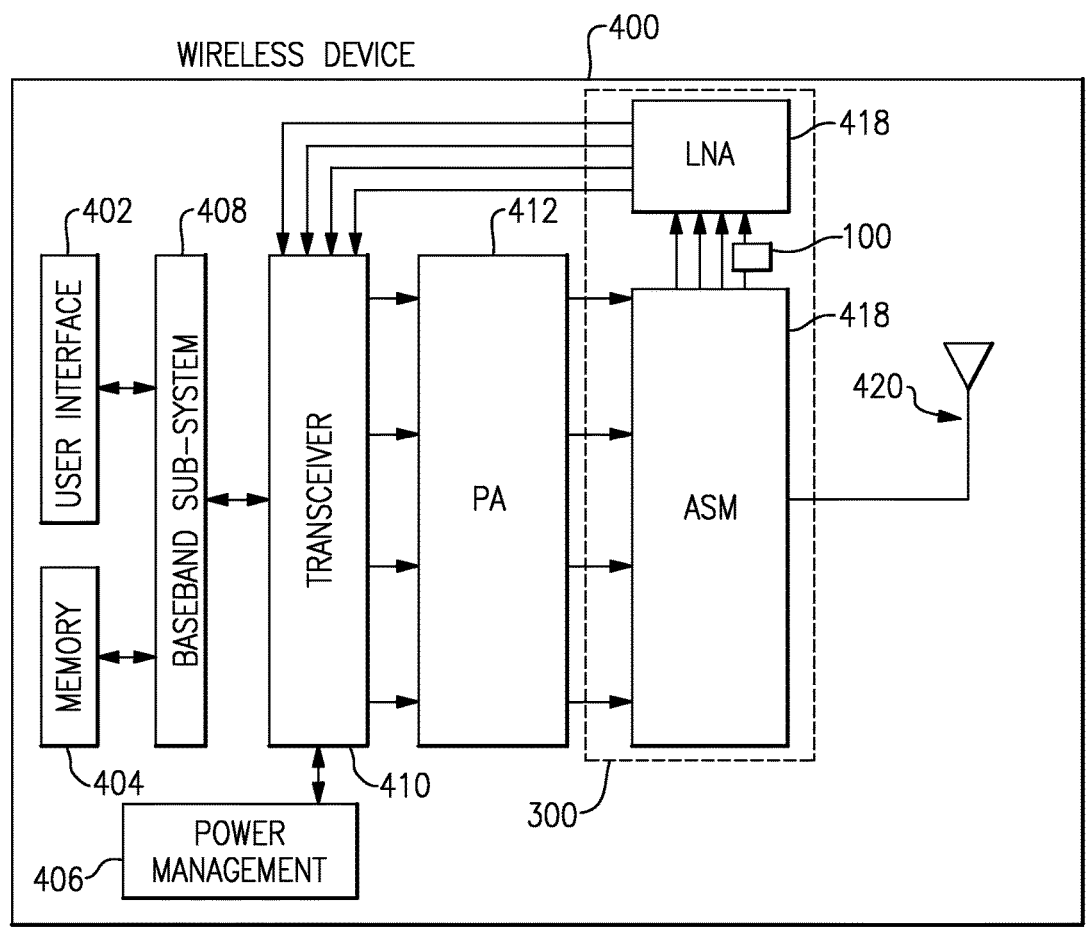
FIG. 14 shows an example wireless device having one or more features as described herein.

FIG. 14 schematically depicts an example wireless device 400 having one or more advantageous features described herein. In some embodiments, such advantageous features can be implemented in a front-end (FE) module 300. In some embodiments, such a FEM can include more or less components than as indicated by the dashed box.

PAs in a PA module 412 can receive their respective RF signals from a transceiver 410 that can be configured and operated to generate RF signals to be amplified and transmitted, and to process received signals. The transceiver 410 is shown to interact with a baseband sub-system 408 that is configured to provide conversion between data and/or voice signals suitable for a user and RF signals suitable for the transceiver 410. The transceiver 410 is also shown to be connected to a power management component 406 that is configured to manage power for the operation of the wireless device 400. Such power management can also control operations of the baseband sub-system 408 and other components of the wireless device 400.

The baseband sub-system 408 is shown to be connected to a user interface 402 to facilitate various input and output of voice and/or data provided to and received from the user. The baseband sub-system 408 can also be connected to a memory 404 that is configured to store data and/or instructions to facilitate the operation of the wireless device, and/or to provide storage of information for the user.

In the example wireless device 400, the front-end module 300 can include a distributed network of signal paths (100) configured to provide one or more functionalities as described herein. Such a network of signal paths can be in communication with an antenna switch module (ASM) 414. In some embodiments, at least some of the signals received through an antenna 420 can be routed from the ASM 414 to one or more low-noise amplifiers (LNAs) 418 through the distributed network of signal paths (100). Amplified signals from the LNAs 418 are shown to be routed to the transceiver 410.

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS.

Examples Related to Diversity Receive (DRx) Implementation:

Using one or more main antennas and one or more diversity antennas in a wireless device can improve quality of signal reception. For example, a diversity antenna can provide additional sampling of RF signals in the vicinity of the wireless device. Additionally, a wireless device's transceiver can be configured to process the signals received by the main and diversity antennas to obtain a receive signal of higher energy and/or improved fidelity, when compared to a configuration using only the main antenna.

To reduce the correlation between signals received by the main and diversity antennas and/or to enhance antenna isolation, the main and diversity antennas can be separated by a relatively large physical distance in the wireless device. For example, the diversity antenna can be positioned near the top of the wireless device and the main antenna can be positioned near the bottom of the wireless device, or vice-versa.

The wireless device can transmit or receive signals using the main antenna by routing corresponding signals from or to the transceiver through an antenna switch module. To meet or exceed design specifications, the transceiver, the antenna switch module, and/or the main antenna can be in relatively close physical proximity to one another in the wireless device. Configuring the wireless device in this manner can provide relatively small signal loss, low noise, and/or high isolation.

In the foregoing example, the main antenna being physically close to the antenna switch module can result in the diversity antenna being positioned relatively far from the antenna switch module. In such a configuration, a relatively long signal path between the diversity antenna and the antenna switch module can result in significant loss and/or addition of loss associated with the signal received through the diversity antenna. Accordingly, processing of the signal received through the diversity antenna, including implementation of one or more features as described herein, in the close proximity to the diversity antenna can be advantageous.

Figure 15:
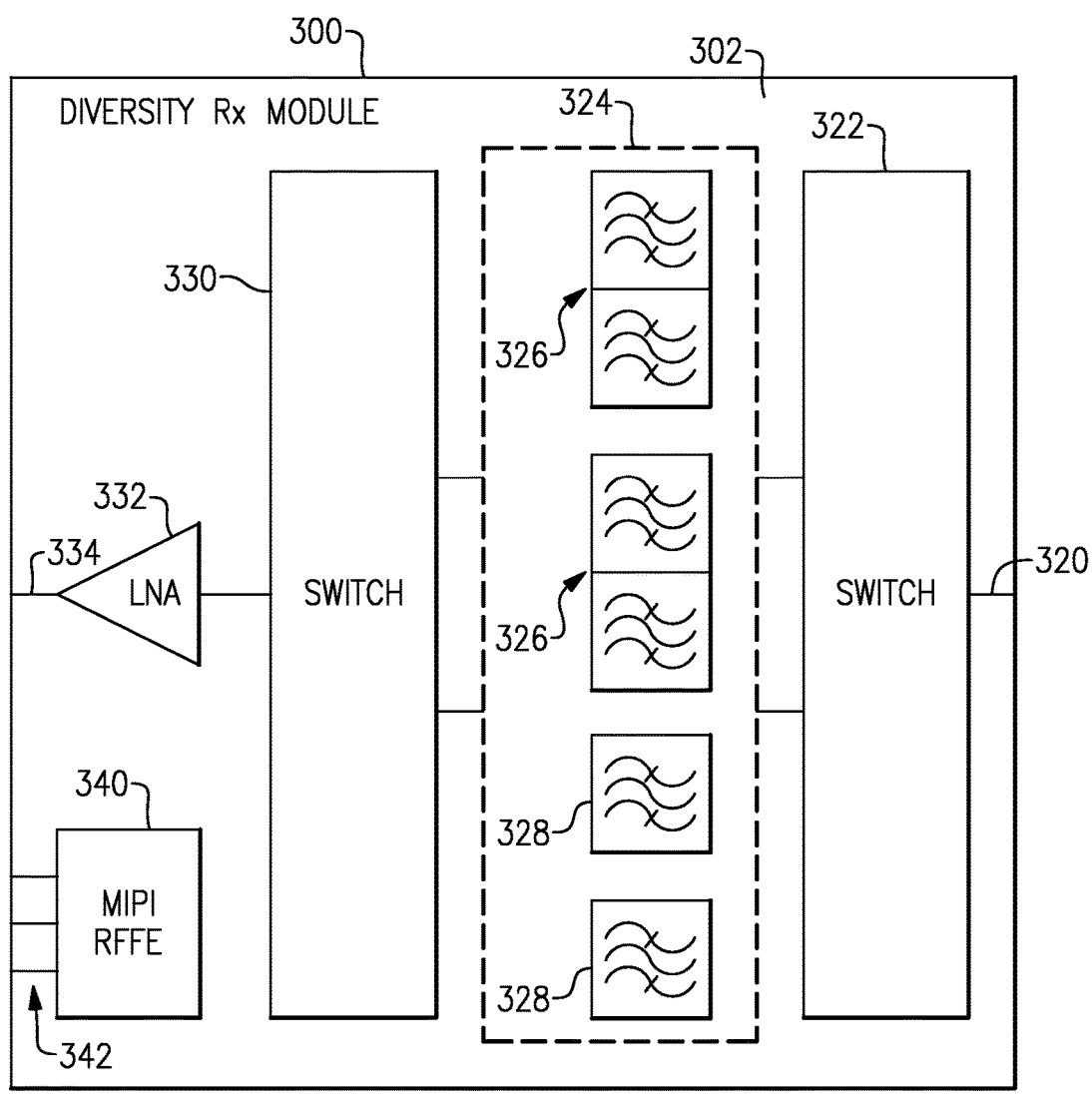
FIG. 15 shows that one or more features of the present disclosure can be implemented in a diversity receive module.

FIG. 15 shows that in some embodiments, one or more features of the present disclosure can be implemented in a diversity receive (DRx) module 300. Such a module can include a packaging substrate 302 (e.g., a laminate substrate) configured to receive a plurality of components, as well to provide or facilitate electrical connections associated with such components.

In the example of FIG. 15, the DRx module 300 can be configured to receive an RF signal from a diversity antenna (not shown in FIG. 15) at an input 320 and route such an RF signal to a low-noise amplifier (LNA) 332. It will be understood that such routing of the RF signal can involve carrier-aggregation (CA) and/or non-CA configurations. It will also be understood that although one LNA (e.g., a broadband LNA) is shown, there may be more than one LNAs in the DRx module 300. Depending on the type of LNA and the mode of operation (e.g., CA or non-CA), an output 334 of the LNA 332 can include one or more frequency components associated with one or more frequency bands.

In some embodiments, some or all of the foregoing routing of the RF signal between the input 320 and the LNA 332 can be facilitated by an assembly of one or more switches 322 between the input 320 and an assembly of diplexer(s) and/or filter(s) (collectively indicated as 324), and an assembly of one or more switches 330 between the diplexer/filter assembly 324 and the LNA 332. In some embodiments, the switch assemblies 322, 330 can be implemented on, for example, one or more silicon-on-insulator (SOI) die. In some embodiments, some or all of the foregoing routing of the RF signal between the input 320 and the LNA 332 can be achieved without some or all of the switches associated with the switch-assemblies 322, 330.

In the example of FIG. 15, the diplexer/filter assembly 324 is depicted as including two example diplexers 326 and two individual filters 328. It will be understood that the DRx module 300 can have more or less numbers of diplexers, and more or less numbers of individual filters. Such diplexer(s)/filter(s) can be implemented as, for example, surface-mount devices (SMDs), as part of an integrated circuit (IC), of some combination thereof. Such diplexers/filters can include or be based on, for example, SAW filters, and can be configured as high Q devices.

In some embodiments, the DRx module 300 can include a control component such as a MIPI RFFE interface 340 configured to provide and/or facilitate control functionalities associated with some or all of the switch assemblies 322, 330 and the LNA 332. Such a control interface can be configured to operate with one or more I/O signals 342.

Figure 16:
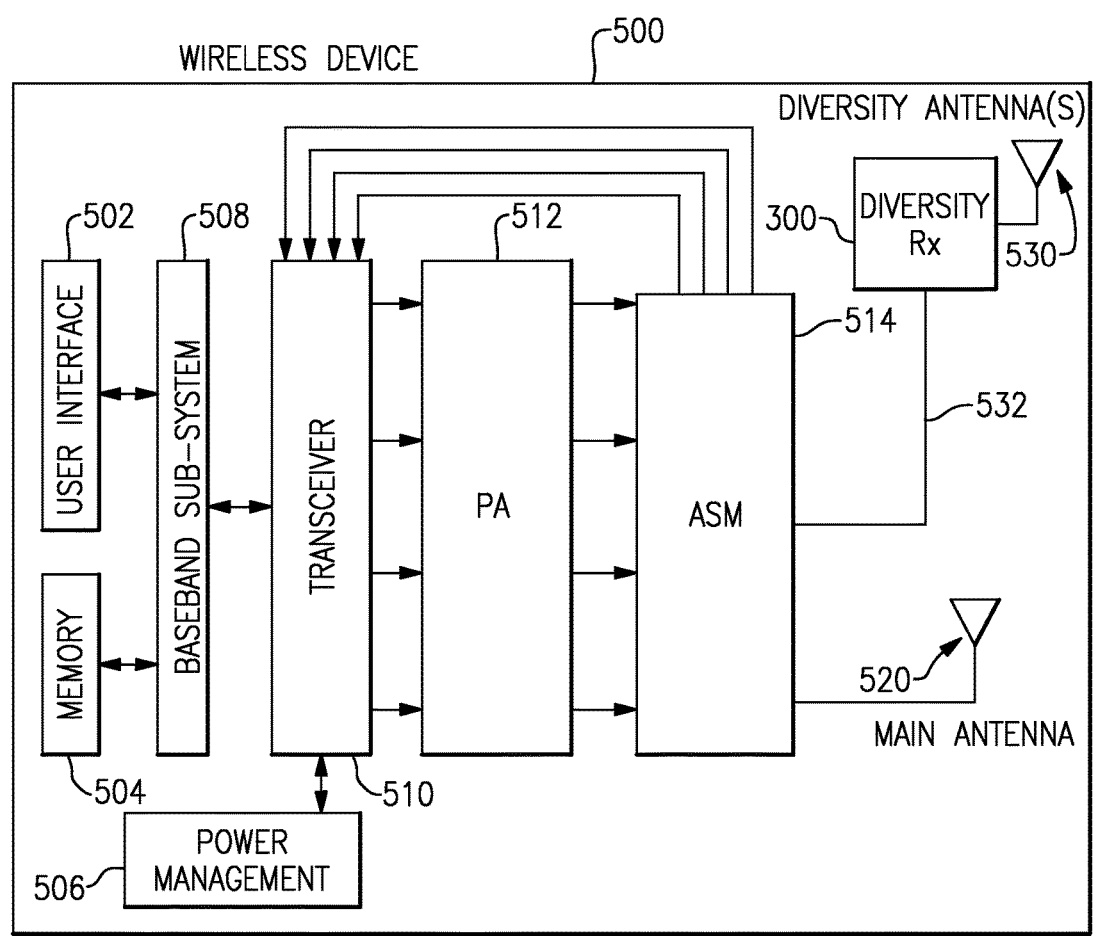
FIG. 16 shows an example wireless device having the diversity receive module of FIG. 15.

FIG. 16 shows that in some embodiments, a DRx module 300 having one or more features as described herein (e.g., DRx module 300 of FIG. 15) can be included in an RF device such as a wireless device 500. In such a wireless device, components such as user interface 502, memory 504, power management 506, baseband sub-system 508, transceiver 510, power amplifier (PA) 512, antenna switch module (ASM) 514, and antenna 520 can be generally similar to the examples of FIG. 14.

In some embodiments, the DRx module 300 can be implemented between one or more diversity antennas and the ASM 514. Such a configuration can allow an RF signal received through the diversity antenna 530 to be processed (in some embodiments, including amplification by an LNA) with little or no loss of and/or little or no addition of noise to the RF signal from the diversity antenna 530. Such processed signal from the DRx module 300 can then be routed to the ASM through one or more signal paths 532 which can be relatively lossy.

In the example of FIG. 16, the RF signal from the DRx module 300 can be routed through the ASM 514 to the transceiver 510 through one or more receive (Rx) paths. Some or all of such Rx paths can include their respective LNA(s). In some embodiments, the RF signal from the DRx module 300 may or may not be further amplified with such LNA(s).

One or more features of the present disclosure can be implemented with various cellular frequency bands as described herein. Examples of such bands are listed in Table 4. It will be understood that at least some of the bands can be divided into sub-bands. It will also be understood that one or more features of the present disclosure can be implemented with frequency ranges that do not have designations such as the examples of Table 4.

TABLE 4

| Band | Mode | Tx Frequency Range (MHz) | Rx Frequency Range (MHz) |
|---|---|---|---|
| B1 | FDD | 1,920-1,980 | 2,110-2,170 |
| B2 | FDD | 1,850-1,910 | 1,930-1,990 |
| B3 | FDD | 1,710-1,785 | 1,805-1,880 |
| B4 | FDD | 1,710-1,755 | 2,110-2,155 |
| B5 | FDD | 824-849 | 869-894 |
| B6 | FDD | 830-840 | 875-885 |
| B7 | FDD | 2,500-2,570 | 2,620-2,690 |
| B8 | FDD | 880-915 | 925-960 |
| B9 | FDD | 1,749.9-1,784.9 | 1,844.9-1,879.9 |
| B10 | FDD | 1,710-1,770 | 2,110-2,170 |
| B11 | FDD | 1,427.9-1,447.9 | 1,475.9-1,495.9 |
| B12 | FDD | 699-716 | 729-746 |
| B13 | FDD | 777-787 | 746-756 |
| B14 | FDD | 788-798 | 758-768 |
| B15 | FDD | 1,900-1,920 | 2,600-2,620 |
| B16 | FDD | 2,010-2,025 | 2,585-2,600 |
| B17 | FDD | 704-716 | 734-746 |
| B18 | FDD | 815-830 | 860-875 |
| B19 | FDD | 830-845 | 875-890 |
| B20 | FDD | 832-862 | 791-821 |
| B21 | FDD | 1,447.9-1,462.9 | 1,495.9-1,510.9 |
| B22 | FDD | 3,410-3,490 | 3,510-3,590 |
| B23 | FDD | 2,000-2,020 | 2,180-2,200 |
| B24 | FDD | 1,626.5-1,660.5 | 1,525-1,559 |
| B25 | FDD | 1,850-1,915 | 1,930-1,995 |
| B26 | FDD | 814-849 | 859-894 |
| B27 | FDD | 807-824 | 852-869 |
| B28 | FDD | 703-748 | 758-803 |
| B29 | FDD | N/A | 716-728 |
| B30 | FDD | 2,305-2,315 | 2,350-2,360 |
| B31 | FDD | 452.5-457.5 | 462.5-467.5 |
| B33 | TDD | 1,900-1,920 | 1,900-1,920 |
| B34 | TDD | 2,010-2,025 | 2,010-2,025 |
| B35 | TDD | 1,850-1,910 | 1,850-1,910 |
| B36 | TDD | 1,930-1,990 | 1,930-1,990 |
| B37 | TDD | 1,910-1,930 | 1,910-1,930 |

TABLE 4-continued

| Band | Mode | Tx Frequency Range (MHz) | Rx Frequency Range (MHz) |
|---|---|---|---|
| B38 | TDD | 2,570-2,620 | 2,570-2,620 |
| B39 | TDD | 1,880-1,920 | 1,880-1,920 |
| B40 | TDD | 2,300-2,400 | 2,300-2,400 |
| B41 | TDD | 2,496-2,690 | 2,496-2,690 |
| B42 | TDD | 3,400-3,600 | 3,400-3,600 |
| B43 | TDD | 3,600-3,800 | 3,600-3,800 |
| B44 | TDD | 703-803 | 703-803 |

For the purpose of description, it will be understood that "multiplexer," "multiplexing" and the like can include "diplexer," "diplexing" and the like.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. An architecture for routing signals, comprising: a common input node and a common output node; and a distributed network implemented between the common input node and the common output node, and including a first diplexer and a second diplexer, the distributed network configured to provide a first path and a second path each configured to route a respective signal between the common input node and the common output node when enabled, the first path including the common input node, a first pre-diplexer switch, the first diplexer, a first post-diplexer switch, a first enable switch, and the common output node, the second path including the common input node, a second pre-diplexer switch, the second diplexer, a second post-diplexer switch, the first enable switch, and the common output node, such that when disabled, each of the first and second paths has the respective pre-diplexer and post-diplexer switches opened to provide enhanced isolation between the common input node and the common output node.

2. The architecture of claim 1 wherein the common input node includes a node coupled to an antenna port, and the common output node includes a node coupled to an input of a low-noise amplifier.

3. The architecture of claim 1 wherein each diplexer includes a plurality of ports diplexed unto a common port.

4. The architecture of claim 3 wherein the distributed network includes diplexer selection paths between the common input node and the respective common ports of the first and second diplexers, each diplexer selection path including the respective pre-diplexer switch implemented as a diplexer selection switch.

5. The architecture of claim 4 wherein the distributed network further includes a first port selection path and a second port selection path for each diplexer, each of the first port selection path and the second port selection path including a port selection switch, such that one of the first and second port selection switches functions as the post-diplexer switch associated with the respective diplexer.

6. The architecture of claim 1 wherein the distributed network is further configured to provide a third path and a fourth path each configured to route a respective signal between the common input node and the common output node when enabled, the third path including the common input node, the first pre-diplexer switch, the first diplexer, a third post-diplexer switch, a second enable switch, and the common output node, the fourth path including the common input node, the second pre-diplexer switch, the second diplexer, a fourth post-diplexer switch, the second enable switch, and the common output node, such that when disabled, each of the third and fourth paths has the respective pre-diplexer and post-diplexer switches opened to provide enhanced isolation between the common input node and the common output node.

7. The architecture of claim 6 wherein each of the first path, the second path, the third path, and the fourth path includes at least two open switches between the common input node and the common output node when disabled.

8. The architecture of claim 6 wherein each of the first path, the second path, the third path, and the fourth path includes more than two closed switches between the common input node and the common output node when enabled.

9. The architecture of claim 6 wherein each of the first path, the second path, the third path, and the fourth path includes three switches between the common input node and the common output node when enabled.

10. The architecture of claim 9 wherein one of the first path and the second path includes two open switches between the common input node and the common output node when disabled and the other path is enabled.

11. The architecture of claim 9 wherein one of the third path and the fourth path includes two open switches between the common input node and the common output node when disabled and the other path is enabled.

12. The architecture of claim 6 wherein the distributed network is configured to be capable of operating in a carrier aggregation mode or in a non-carrier aggregation mode.

13. A radio-frequency module comprising: a packaging substrate configured to receive a plurality of components; a common input node and a common output node implemented on or within the packaging substrate; and a distributed network provided on the packaging substrate to be between the common input node and the common output node, and including a first diplexer and a second diplexer, the distributed network configured to provide a first path and a second path each configured to route a respective signal between the common input node and the common output node when enabled, the first path including the common input node, a first pre-diplexer switch, the first diplexer, a first post-diplexer switch, a first enable switch, and the common output node, the second path including the common input node, a second pre-diplexer switch, the second diplexer, a second post-diplexer switch, the first enable switch, and the common output node, such that when disabled, each of the first and second paths has the respective pre-diplexer and post-diplexer switches opened to provide enhanced isolation between the common input node and the common output node.

14. The radio-frequency module of claim 13 further comprising a low-noise amplifier implemented on the packaging substrate and coupled to the common output node to receive one or more signals from the distributed network.

15. The radio-frequency module of claim 14 wherein the radio-frequency module is a receive module implemented to operate with a diversity antenna.

16. A wireless device comprising: a receiver configured to process signals; a distributed network in communication with the receiver and implemented between a common input node and a common output node, the distributed network including a first diplexer and a second diplexer, the distributed network configured to provide a first path and a second path each configured to route a respective signal between the common input node and the common output node when enabled, the first path including the common input node, a first pre-diplexer switch, the first diplexer, a first post-diplexer switch, a first enable switch, and the common output node, the second path including the common input node, a second pre-diplexer switch, the second diplexer, a second post-diplexer switch, the first enable switch, and the common output node, such that when disabled, each of the first and second paths has the respective pre-diplexer and post-diplexer switches opened to provide enhanced isolation between the common input node and the common output node; and an antenna in communication with the common input node of the distributed network and configured to receive the signals.

17. The wireless device of claim 16 wherein the antenna includes a diversity antenna.

18. The wireless device of claim 17 further comprising an antenna switch module configured to route the signals from the diversity antenna to the receiver, such that the distributed network is implemented between the diversity antenna and the antenna switch module.

* * * * *